(12) United States Patent
Fueg et al.

(10) Patent No.: US 10,433,097 B2
(45) Date of Patent: Oct. 1, 2019

(54) METHOD FOR PROCESSING AN AUDIO SIGNAL IN ACCORDANCE WITH A ROOM IMPULSE RESPONSE, SIGNAL PROCESSING UNIT, AUDIO ENCODER, AUDIO DECODER, AND BINAURAL RENDERER

(71) Applicant: Fraunhofer-Gesellschaft zur Foerderung der angewandten Forschung e.V., Munich (DE)

(72) Inventors: Simone Fueg, Kalchreuth (DE); Jan Plogsties, Fuerth (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 748 days.

(21) Appl. No.: 15/003,287

(22) Filed: Jan. 21, 2016

(65) Prior Publication Data

US 2016/0142854 A1 May 19, 2016

Related U.S. Application Data

(63) Continuation of application No. PCT/EP2014/065227, filed on Jul. 16, 2014.

(30) Foreign Application Priority Data

Jul. 22, 2013 (EP) .................................... 13177362
Oct. 18, 2013 (EP) .................................... 13189230

(51) Int. Cl.
*H04S 7/00* (2006.01)
*G10K 15/08* (2006.01)
(Continued)

(52) U.S. Cl.
CPC ............... *H04S 7/305* (2013.01); *G01H 7/00* (2013.01); *G10K 15/08* (2013.01); *G10K 15/12* (2013.01);
(Continued)

(58) Field of Classification Search
USPC .......................................................... 702/75
See application file for complete search history.

(56) References Cited

U.S. PATENT DOCUMENTS 5,371,799 A * 12/1994 Lowe ..................... H04S 1/005
381/17
6,188,769 B1 2/2001 Jot et al.
(Continued)

FOREIGN PATENT DOCUMENTS

CN 102592606 A 7/2012
CN 102928067 A 2/2013
(Continued)

OTHER PUBLICATIONS

Hidaka, et al., "A new definition fo boundary point between early reflections and later reverberation in room impulse responses", Journal of the Acoustical Society of America, vol. 122, No. 1, Jul. 1, 2007, XP012102314, ISSN: 0001-4966, DOI: 10.1121/1.2743161, pp. 326-332.
(Continued)

*Primary Examiner* — Paul D Lee
(74) *Attorney, Agent, or Firm* — Perkins Coie LLP; Michael A. Glenn

(57) ABSTRACT

A method for processing an audio signal in accordance with a room impulse response is described. The audio signal is separately processed with an early part and a late reverberation of the room impulse response, and the processed early part of the audio signal and the reverberated signal are combined. A transition from the early part to the late
(Continued)

reverberation in the room impulse response is reached when a correlation measure reaches a threshold, the threshold being set dependent on the correlation measure for a selected one of the early reflections in the early part of the room impulse response.

19 Claims, 13 Drawing Sheets

(51) Int. Cl.
*H04S 3/00* (2006.01)
*G01H 7/00* (2006.01)
*G10K 15/12* (2006.01)
*G10L 19/008* (2013.01)

(52) U.S. Cl.
CPC ............ *G10L 19/008* (2013.01); *H04S 3/004* (2013.01); *H04S 2400/01* (2013.01); *H04S 2400/03* (2013.01); *H04S 2420/01* (2013.01)

(56) References Cited

U.S. PATENT DOCUMENTS

| | | | |
|---|---|---|---|
| 2006/0086237 A1 | 4/2006 | Burwen | |
| 2008/0175396 A1 | 7/2008 | Ko et al. | |
| 2010/0119075 A1* | 5/2010 | Xiang | G10K 15/10 381/63 |
| 2012/0140938 A1* | 6/2012 | Yoo | G10L 21/02 381/63 |
| 2013/0216059 A1* | 8/2013 | Yoo | G10K 11/002 381/71.2 |

FOREIGN PATENT DOCUMENTS

| | | |
|---|---|---|
| EP | 2028884 A1 | 2/2009 |
| JP | 2009053349 A | 3/2009 |
| KR | 100598003 B1 | 6/2006 |
| RU | 2403674 C2 | 11/2010 |
| WO | 99/49574 A1 | 9/1999 |

OTHER PUBLICATIONS

Hu, Yuehui, "Study on Speech Location in a Reverberation Room", Wanfang Data, Jul. 27, 2011.

* cited by examiner

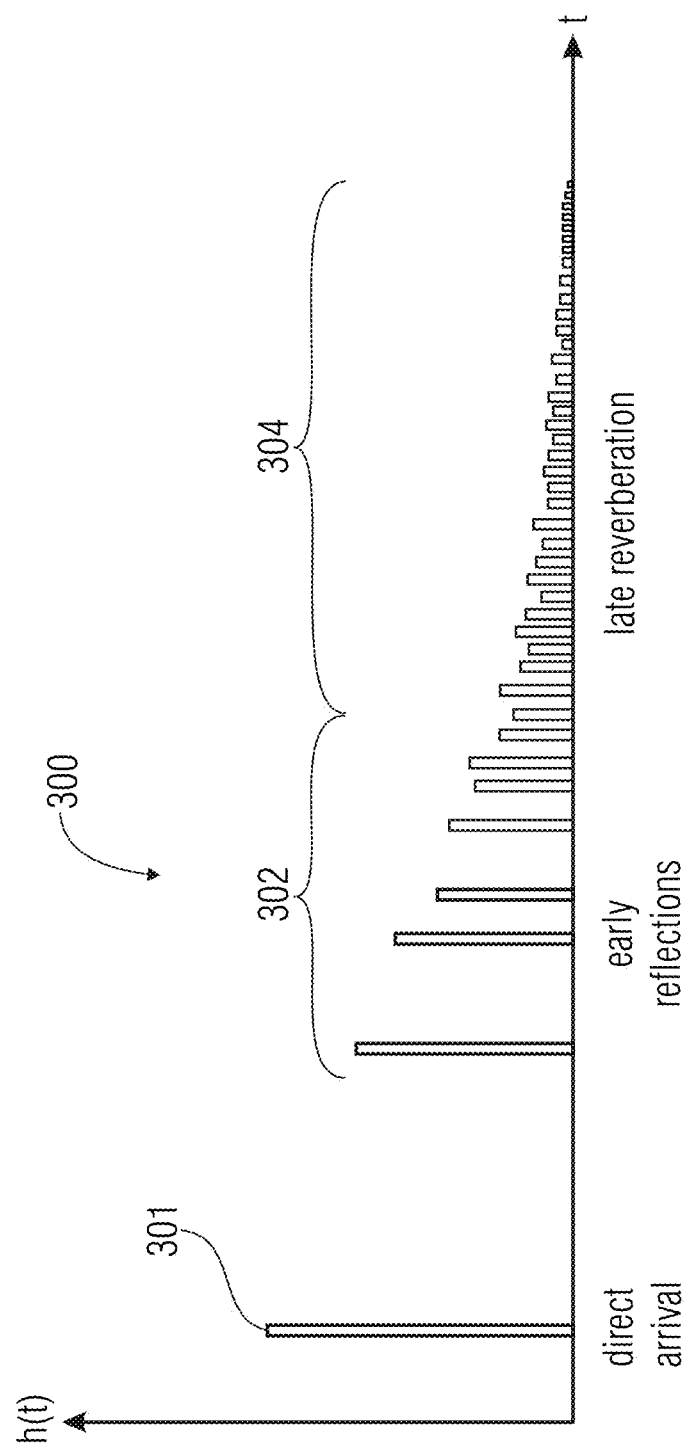

METHOD FOR PROCESSING AN AUDIO SIGNAL IN ACCORDANCE WITH A ROOM IMPULSE RESPONSE, SIGNAL PROCESSING UNIT, AUDIO ENCODER, AUDIO DECODER, AND BINAURAL RENDERER

CROSS-REFERENCE TO RELATED APPLICATIONS

This application is a continuation of copending International Application No. PCT/EP2014/065227, filed Jul. 16, 2014, which is incorporated herein by reference in its entirety, and additionally claims priority from European Applications Nos. EP 13177362, filed Jul. 22, 2013, and EP 13189230, filed Oct. 18, 2013, both of which are incorporated herein by reference in their entirety.

The present invention relates to the field of audio encoding/decoding, especially to spatial audio coding and spatial audio object coding, e.g. the field of 3D audio codec systems. Embodiments of the invention relate to approaches for processing an audio signal in accordance with a room impulse response and for determining in such a room impulse response a transition from early reflections to late reverberation.

BACKGROUND OF THE INVENTION

Spatial audio coding tools are well-known in the art and are standardized, for example, in the MPEG-surround standard. Spatial audio coding starts from a plurality of original input, e.g., five or seven input channels, which are identified by their placement in a reproduction setup, e.g., as a left channel, a center channel, a right channel, a left surround channel, a right surround channel and a low frequency enhancement channel. A spatial audio encoder may derive one or more downmix channels from the original channels and, additionally, may derive parametric data relating to spatial cues such as interchannel level differences in the channel coherence values, interchannel phase differences, interchannel time differences, etc. The one or more downmix channels are transmitted together with the parametric side information indicating the spatial cues to a spatial audio decoder for decoding the downmix channels and the associated parametric data in order to finally obtain output channels which are an approximated version of the original input channels. The placement of the channels in the output setup may be fixed, e.g., a 5.1 format, a 7.1 format, etc.

Also, spatial audio object coding tools are well-known in the art and are standardized, for example, in the MPEG SAOC standard (SAOC=spatial audio object coding). In contrast to spatial audio coding starting from original channels, spatial audio object coding starts from audio objects which are not automatically dedicated for a certain rendering reproduction setup. Rather, the placement of the audio objects in the reproduction scene is flexible and may be set by a user, e.g., by inputting certain rendering information into a spatial audio object coding decoder. Alternatively or additionally, rendering information may be transmitted as additional side information or metadata; rendering information may include information at which position in the reproduction setup a certain audio object is to be placed (e.g. over time). In order to obtain a certain data compression, a number of audio objects is encoded using an SAOC encoder which calculates, from the input objects, one or more transport channels by downmixing the objects in accordance with certain downmixing information. Furthermore, the SAOC encoder calculates parametric side information representing inter-object cues such as object level differences (OLD), object coherence values, etc. As in SAC (SAC=Spatial Audio Coding), the inter object parametric data is calculated for individual time/frequency tiles. For a certain frame (for example, 1024 or 2048 samples) of the audio signal a plurality of frequency bands (for example 24, 32, or 64 bands) are considered so that parametric data is provided for each frame and each frequency band. For example, when an audio piece has 20 frames and when each frame is subdivided into 32 frequency bands, the number of time/frequency tiles is 640.

In 3D audio systems it may be desired to provide a spatial impression of an audio signal as if the audio signal is listened to in a specific room. In such a situation, a room impulse response of the specific room is provided, for example on the basis of a measurement thereof, and is used for processing the audio signal upon presenting it to a listener. It may be desired to process the direct sound and early reflections in such a presentation separated from the late reverberation. This involves determining where the early reflections end and where the late reverberation starts.

SUMMARY

According to an embodiment, a method for processing an audio signal in accordance with a room impulse response may have the steps of: separately processing the audio signal with an early part and a late reverberation of the room impulse response; and combining the audio signal processed with the early part of the room impulse response and a reverberated signal, wherein a transition from the early part to the late reverberation in the room impulse response is determined once a correlation measure reaches a threshold, wherein the correlation measure describes with regard to the room impulse response a similarity of a decay in acoustic energy including an initial state and of the decay in acoustic energy starting at a time following the initial state over a predefined frequency range, wherein the threshold is set dependent on the correlation measure for a selected one of the early reflections in the early part of the room impulse response, and wherein the selected one of the early reflections is the first reflection.

According to another embodiment, a non-transitory digital storage medium may have computer-readable code stored thereon to perform the inventive method when said storage medium is run by a computer.

According to another embodiment, a signal processing unit may have: an input for receiving an audio signal; a processor configured to process the received audio signal in accordance with a room impulse response according to the inventive method; and an output for combining the processed early part of the received audio signal and the reverberated signal into an output audio signal.

Another embodiment may have an audio encoder for encoding an audio signal, wherein the audio encoder is configured to process an audio signal to be encoded in accordance with a room impulse response in accordance with the inventive method.

Another embodiment may have an audio decoder for decoding an encoded audio signal, wherein the audio decoder is configured to process a decoded audio signal in accordance with a room impulse response in accordance with the inventive method.

According to another embodiment, a binaural renderer may have an inventive signal processing unit.

The present invention is based on the inventor's findings that in conventional approaches a problem exists in that there are situations where the determination of the transition from early reflections to late reverberation is too early because a correlation used for judging the occurrence of the transition already reaches a threshold before the first reflection even occurred or impinged. On the basis of these findings and since it is known that the transition time is larger than the arrival time of the first reflection, because the first reflection is clearly distinct and can for sure not be the late diffuse reverberation, the inventors found that it is useful to avoid the use of a fixed threshold, rather, in accordance with the inventive approach the threshold is defined such that it is dependent on the correlation at the impinging time of one of the early reflections. This assures that the first reflection is located before the transition time.

(1) The present invention provides a method for processing an audio signal in accordance with a room impulse response, the method comprising:

separately processing the audio signal with an early part and a late reverberation of the room impulse response; and combining the audio signal processed with the early part of the room impulse response and the reverberated signal, wherein a transition from the early part to the late reverberation in the room impulse response is determined by a correlation measure that reaches a threshold, the threshold being set dependent on the correlation measure for a selected one of the early reflections in the early part of the room impulse response.

The inventive approach is advantageous as it allows for an improved processing of the audio signal on the basis of a robust transition point. The inventive approach is independent of the room, of whether or not a binaural approach is used and of the angle of incidence. When compared to conventional-technology approaches, the inventive approach is further advantages because it is not strongly dependent on the azimuthal angle of a binaural impulse response and the relation between the amplitudes of direct sound and first impinging reflection.

(2) In accordance with embodiments the correlation measure describes with regard to the room impulse response the similarity of the decay in acoustic energy including the initial state and of the decay in acoustic energy starting at any time following the initial state over a predefined frequency range.

(3) In accordance with embodiments determining the transition comprises determining a distribution of acoustic energy based on the room impulse response, and determining a plurality of correlation measures indicating for a plurality of portions of the determined distribution a correlation between the acoustic energy in the respective portion of the determined distribution and the acoustic energy at an initial state.

(4) In accordance with embodiments determining the distribution comprises determining a time-frequency distribution of the acoustic energy, wherein a portion of the distribution comprises a time block of a predefined length, the initial state being defined by the first one of the plurality of time blocks of the time-frequency distribution.

This is advantageous as it allows to analyze the frequency distribution at different times, thereby providing a representation of the frequency distribution's characteristics over time.

(5) In accordance with embodiments determining the distribution comprises calculating the energy decay relief (EDR) from the room impulse response, wherein the EDR is calculated as follows:

$$E(t,\omega) = |\int_t^\infty h(\tau)e^{-j\omega\tau}d\tau|^2$$

where
$E(t,\omega)$=energy decay relief,
$h(\tau)$=room impulse response,
$\omega=2\pi f$.

(6) In accordance with embodiments the room impulse response has a predefined effective length, and wherein determining the time-frequency distribution comprises calculating the FFT spectrum of the room impulse response using a window having a length corresponding to the effective length of the room impulse response.

This is advantageous as the FFT/DFT is well defined and there are effective algorithms to calculate the spectral values. If the values in the window are known, the FFT/DFT can be calculated in an uncomplicated manner.

(7) In accordance with embodiments the acoustic energy at the initial state is determined by taking the whole effective length of the room impulse response, calculating the FFT spectrum and taking the square of the absolute values, and the acoustic energy of a time block is determined by shifting the window by the time associated with the time block, zero-padding the windowed samples to the effective length, calculating the FFT and taking the square of the absolute values.

This is advantageous as no additional filter bank or the like is required for the narrow band calculation of the EDR; only a shifting of the window may be used.

(8) In accordance with embodiments the correlation measure is a correlation measure describing the similarity of the decay in acoustic energy including the initial state and the decay in acoustic energy starting at any time following the initial state. The correlation measure may be calculated as follows:

$$\rho(t) = \frac{\sum_\omega (E(1,\omega) - \overline{E}(1,\omega)) \cdot \sum_\omega (E(t,\omega) - \overline{E}(t,\omega))}{\sqrt{\sum_\omega (E(1,\omega) - \overline{E}(1,\omega))^2} \cdot \sqrt{\sum_\omega (E(t,\omega) - \overline{E}(t,\omega))^2}}$$

where
$\rho(t)$=correlation measure,
$E(1,\omega)$=full frequency range energy decay relief at frequency f,
$\overline{E}(1,\omega)$=mean value over all frequencies of the initial full range energy decay relief,
$E(t,\omega)$=energy decay relief at frequency f starting a time t,
$\overline{E}(t,\omega)$=mean value over all frequencies of the full range energy decay relief starting at time t, $\omega=2\pi f$.

This is advantageous as the formula refers to the well-known Pearson's correlation coefficient (Pearson's Product-Moment correlation). The correlation coefficient can be calculated directly from the EDR.

(9) In accordance with embodiments the threshold is determined based on a constant value and the correlation measure for the selected one of the early reflections. The threshold may be defined as follows:

$$\rho(t) = c \cdot \rho(t_F)$$

where
$\rho(t_F)$=correlation measure for the selected one of the early reflections, $t_F$=time index where the selected one of the early reflections after the direct sound impinges,
c=the constant value that is based on $$\frac{1}{e},$$

e being the Euler number.

This is advantageous as the threshold is not constant, but dependent on the selected early reflection to assure that the correlation falls not too early below the threshold.

(10) In accordance with embodiments the time of the selected one of the early reflections is determined, e.g. by a running kurtosis operator, by a threshold detection or by an attack detection.

This is advantageous as the time of impinge of the reflection can be calculated directly and automatically from the time domain samples of the impulse response.

(11) In accordance with embodiments the selected one of the early reflections is the first reflection following the direct sound.

(12) The present invention provides a signal processing unit, comprising an input for receiving an audio signal, a processor configured or programmed to process a received audio signal in accordance with a room impulse response according to the inventive method, and an output for combining the processed early part of the received audio signal and the reverberated signal into an output audio signal. The signal processing unit may comprise an early part processor for processing the received audio signal in accordance with the early part of the room impulse response, and a late reverberation processor for processing the received audio signal in accordance with the late reverberation of the room impulse response.

(13) The present invention provides an audio encoder for encoding an audio signal, wherein the audio encoder is configured or programmed to process an audio signal to be encoded in accordance with a room impulse response in accordance with the inventive method. The audio encoder may comprises the inventive signal processing unit.

(14) The present invention provides an audio decoder for decoding an encoded audio signal, wherein the audio decoder is configured or programmed to process a decoded audio signal in accordance with a room impulse response in accordance with the inventive method. The audio decoder may comprise the inventive signal processing unit. The audio decoder may comprise a renderer, like a binaural renderer, configured or programmed to receive the decoded audio signal and to render output signals based on the room impulse response.

(15) The present invention provides a binaural renderer comprising the inventive signal processing unit.

BRIEF DESCRIPTION OF THE DRAWINGS

Embodiments of the present invention will be detailed subsequently referring to the appended drawings, in which:

FIG. 5 illustrates an example of a room impulse response h(t);

DETAILED DESCRIPTION OF THE INVENTION

Embodiments of the inventive approach for processing an audio signal in accordance with a room impulse response and for determining in a room impulse response a transition from early reflections to late reverberation will be described. The following description will start with a system overview of a 3D audio codec system in which the inventive approach may be implemented.

Figure 1:
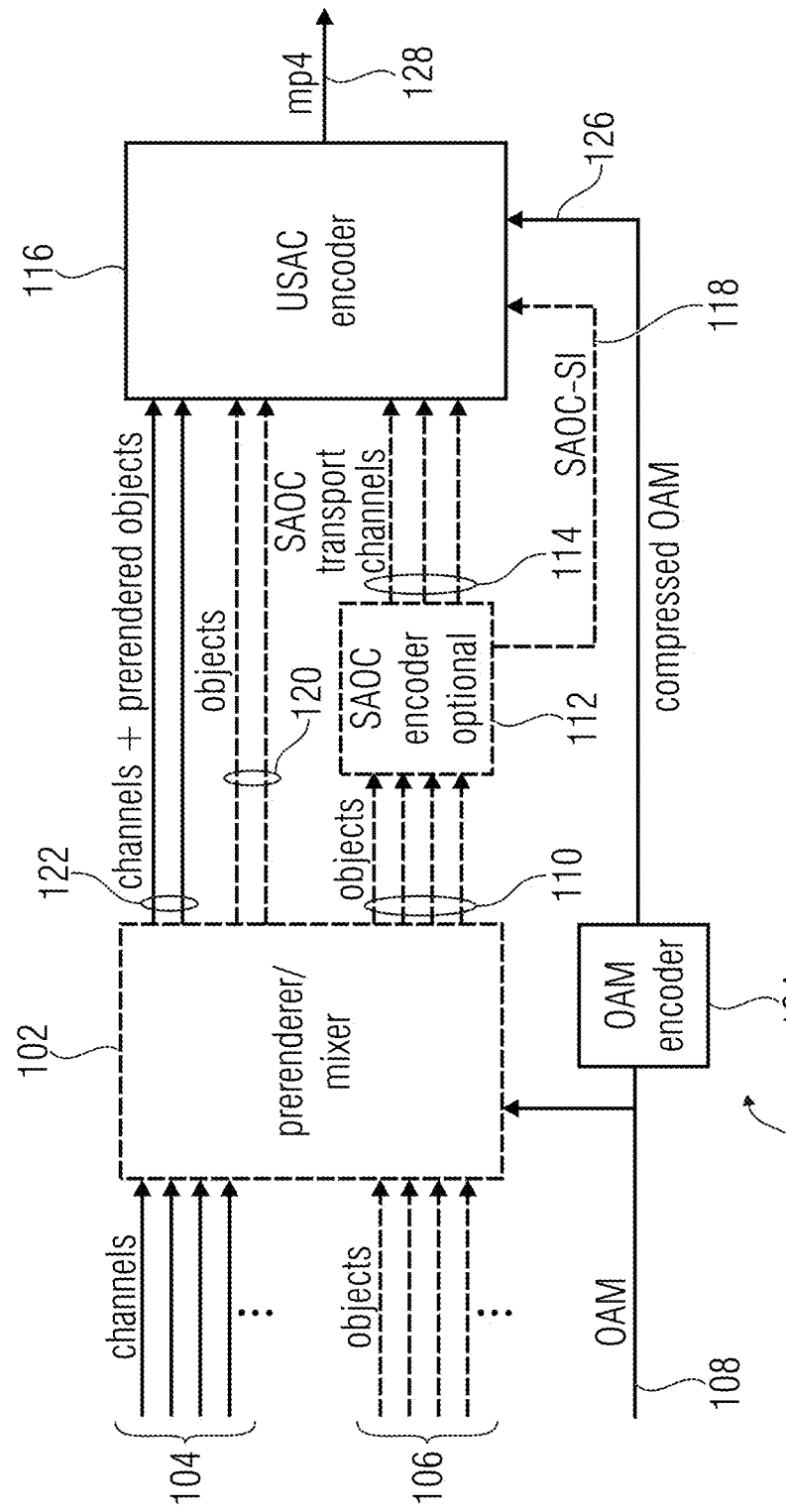
FIG. 1 illustrates an overview of a 3D audio encoder of a 3D audio system.
Figure 2:
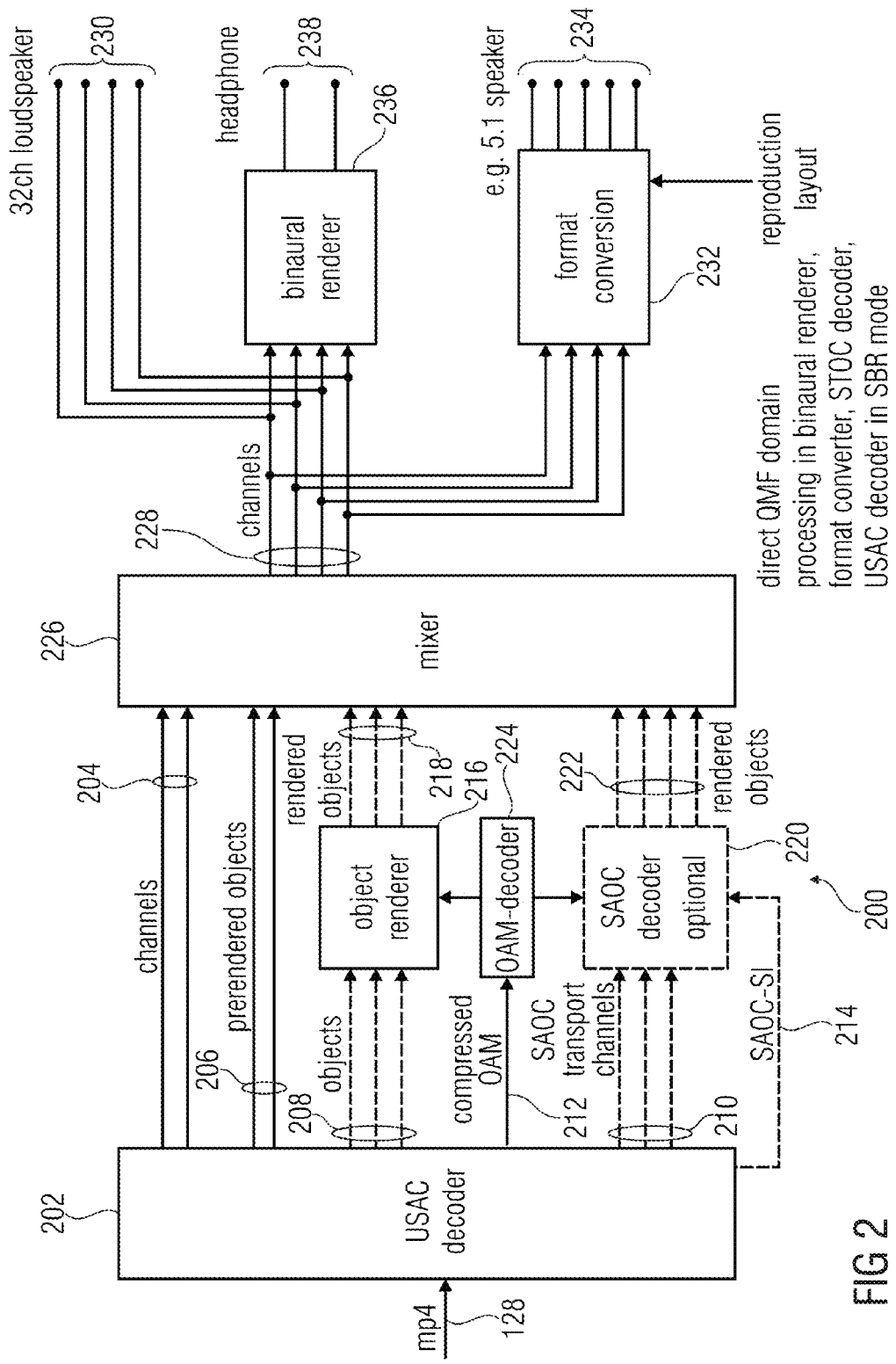
FIG. 2 illustrates an overview of a 3D audio decoder of a 3D audio system.

FIGS. 1 and 2 show the algorithmic blocks of a 3D audio system in accordance with embodiments. More specifically, FIG. 1 shows an overview of a 3D audio encoder 100. The audio encoder 100 receives at a pre-renderer/mixer circuit 102, which may be optionally provided, input signals, more specifically a plurality of input channels providing to the audio encoder 100 a plurality of channel signals 104, a plurality of object signals 106 and corresponding object metadata 108. The object signals 106 processed by the pre-renderer/mixer 102 (see signals 110) may be provided to a SAOC encoder 112 (SAOC=Spatial Audio Object Coding). The SAOC encoder 112 generates the SAOC transport channels 114 provided to an USAC encoder 116 (USAC=Unified Speech and Audio Coding). In addition, the signal SAOC-SI 118 (SAOC-SI=SAOC side information) is also provided to the USAC encoder 116. The USAC encoder 116 further receives object signals 120 directly from the pre-renderer/mixer as well as the channel signals and pre-rendered object signals 122. The object metadata information 108 is applied to a OAM encoder 124 (OAM=object metadata) providing the compressed object metadata information 126 to the USAC encoder. The USAC encoder 116, on the basis of the above mentioned input signals, generates a compressed output signal mp4, as is shown at 128.

FIG. 2 shows an overview of a 3D audio decoder 200 of the 3D audio system. The encoded signal 128 (mp4) generated by the audio encoder 100 of FIG. 1 is received at the audio decoder 200, more specifically at an USAC decoder 202. The USAC decoder 202 decodes the received signal 128 into the channel signals 204, the pre-rendered object signals 206, the object signals 208, and the SAOC transport channel signals 210. Further, the compressed object metadata information 212 and the signal SAOC-SI 214 is output by the USAC decoder 202. The object signals 208 are provided to an object renderer 216 outputting the rendered object signals 218. The SAOC transport channel signals 210 are supplied to the SAOC decoder 220 outputting the rendered object signals 222. The compressed object meta information 212 is supplied to the OAM decoder 224 outputting respective control signals to the object renderer 216 and the SAOC decoder 220 for generating the rendered object signals 218 and the rendered object signals 222. The decoder further comprises a mixer 226 receiving, as shown in FIG. 2, the input signals 204, 206, 218 and 222 for outputting the channel signals 228. The channel signals can be directly output to a loudspeaker, e.g., a 32 channel loudspeaker, as is indicated at 230. The signals 228 may be provided to a format conversion circuit 232 receiving as a control input a reproduction layout signal indicating the way the channel signals 228 are to be converted. In the embodiment depicted in FIG. 2, it is assumed that the conversion is to be done in such a way that the signals can be provided to a 5.1 speaker system as is indicated at 234. Also, the channel signals 228 may be provided to a binaural renderer 236 generating two output signals, for example for a headphone, as is indicated at 238.

In an embodiment of the present invention, the encoding/decoding system depicted in FIGS. 1 and 2 is based on the MPEG-D USAC codec for coding of channel and object signals (see signals 104 and 106). To increase the efficiency for coding a large amount of objects, the MPEG SAOC technology may be used. Three types of renderers may perform the tasks of rendering objects to channels, rendering channels to headphones or rendering channels to a different loudspeaker setup (see FIG. 2, reference signs 230, 234 and 238). When object signals are explicitly transmitted or parametrically encoded using SAOC, the corresponding object metadata information 108 is compressed (see signal 126) and multiplexed into the 3D audio bitstream 128.

The algorithm blocks of the overall 3D audio system shown in FIGS. 1 and 2 will be described in further detail below.

The pre-renderer/mixer 102 may be optionally provided to convert a channel plus object input scene into a channel scene before encoding. Functionally, it is identical to the object renderer/mixer that will be described below. Pre-rendering of objects may be desired to ensure a deterministic signal entropy at the encoder input that is basically independent of the number of simultaneously active object signals. Wth pre-rendering of objects, no object metadata transmission is required. Discrete object signals are rendered to the channel layout that the encoder is configured to use. The weights of the objects for each channel are obtained from the associated object metadata (OAM).

The USAC encoder 116 is the core codec for loudspeaker-channel signals, discrete object signals, object downmix signals and pre-rendered signals. It is based on the MPEG-D USAC technology. It handles the coding of the above signals by creating channel- and object mapping information based on the geometric and semantic information of the input channel and object assignment. This mapping information describes how input channels and objects are mapped to USAC-channel elements, like channel pair elements (CPEs), single channel elements (SCEs), low frequency effects (LFEs) and quad channel elements (QCEs) and CPEs, SCEs and LFEs, and the corresponding information is transmitted to the decoder. All additional payloads like SAOC data 114, 118 or object metadata 126 are considered in the encoder's rate control. The coding of objects is possible in different ways, depending on the rate/distortion requirements and the interactivity requirements for the renderer. In accordance with embodiments, the following object coding variants are possible:

Pre-rendered objects: Object signals are pre-rendered and mixed to the 22.2 channel signals before encoding. The subsequent coding chain sees 22.2 channel signals.

Discrete object waveforms: Objects are supplied as monophonic waveforms to the encoder. The encoder uses single channel elements (SCEs) to transmit the objects in addition to the channel signals. The decoded objects are rendered and mixed at the receiver side. Compressed object metadata information is transmitted to the receiver/renderer.

Parametric object waveforms: Object properties and their relation to each other are described by means of SAOC parameters. The downmix of the object signals is coded with the USAC. The parametric information is transmitted alongside. The number of downmix channels is chosen depending on the number of objects and the overall data rate. Compressed object metadata information is transmitted to the SAOC renderer.

The SAOC encoder 112 and the SAOC decoder 220 for object signals may be based on the MPEG SAOC technology. The system is capable of recreating, modifying and rendering a number of audio objects based on a smaller number of transmitted channels and additional parametric data, such as OLDs, IOCs (Inter Object Coherence), DMGs (DownMix Gains). The additional parametric data exhibits a significantly lower data rate than may be used for transmitting all objects individually, making the coding very efficient. The SAOC encoder 112 takes as input the object/channel signals as monophonic waveforms and outputs the parametric information (which is packed into the 3D-Audio bitstream 128) and the SAOC transport channels (which are encoded using single channel elements and are transmitted). The SAOC decoder 220 reconstructs the object/channel signals from the decoded SAOC transport channels 210 and the parametric information 214, and generates the output audio scene based on the reproduction layout, the decompressed object metadata information and optionally on the basis of the user interaction information.

The object metadata codec (see OAM encoder 124 and OAM decoder 224) is provided so that, for each object, the associated metadata that specifies the geometrical position and volume of the objects in the 3D space is efficiently coded by quantization of the object properties in time and space. The compressed object metadata cOAM 126 is transmitted to the receiver 200 as side information.

The object renderer 216 utilizes the compressed object metadata to generate object waveforms according to the given reproduction format. Each object is rendered to a certain output channel according to its metadata. The output of this block results from the sum of the partial results. If both channel based content as well as discrete/parametric objects are decoded, the channel based waveforms and the rendered object waveforms are mixed by the mixer 226 before outputting the resulting waveforms 228 or before feeding them to a postprocessor module like the binaural renderer 236 or the loudspeaker renderer module 232.

The binaural renderer module 236 produces a binaural downmix of the multichannel audio material such that each input channel is represented by a virtual sound source. The processing is conducted frame-wise in the QMF (Quadrature Mirror Filterbank) domain, and the binauralization is based on measured binaural room impulse responses.

The loudspeaker renderer 232 converts between the transmitted channel configuration 228 and the desired reproduction format. It may also be called "format converter". The format converter performs conversions to lower numbers of output channels, i.e., it creates downmixes.

Figure 3:
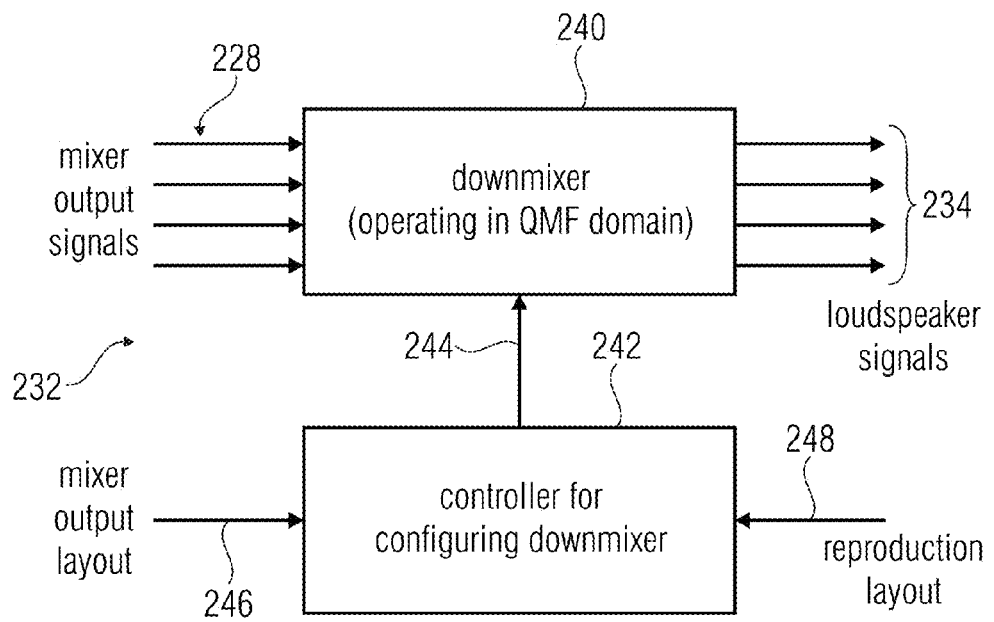
FIG. 3 illustrates an example for implementing a format converter that may be implemented in the 3D audio decoder of FIG. 2.

FIG. 3 shows an example for implementing a format converter 232. The format converter 232, also referred to as loudspeaker renderer, converts between the transmitter channel configuration and the desired reproduction format. The format converter 232 performs conversions to a lower number of output channels, i.e., it performs a downmix (DMX) process 240. The downmixer 240, which advantageously operates in the QMF domain, receives the mixer output signals 228 and outputs the loudspeaker signals 234. A configurator 242, also referred to as controller, may be provided which receives, as a control input, a signal 246 indicative of the mixer output layout, i.e., the layout for which data represented by the mixer output signal 228 is determined, and the signal 248 indicative of the desired reproduction layout. Based on this information, the controller 242, advantageously automatically, generates optimized downmix matrices for the given combination of input and output formats and applies these matrices to the downmixer 240. The format converter 232 allows for standard loudspeaker configurations as well as for random configurations with non-standard loudspeaker positions.

Figure 4:
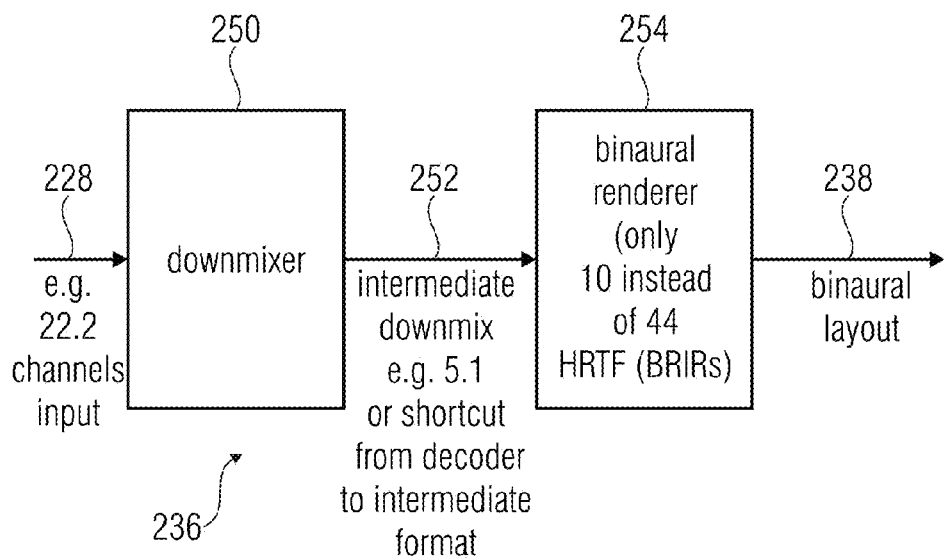
FIG. 4 illustrates an embodiment of a binaural renderer that may be implemented in the 3D audio decoder of FIG. 2.

FIG. 4 illustrates an embodiment of the binaural renderer 236 of FIG. 2. The binaural renderer module may provide a binaural downmix of the multichannel audio material. The binauralization may be based on a measured binaural room impulse response. The room impulse response may be considered a "fingerprint" of the acoustic properties of a real room. The room impulse response is measured and stored, and arbitrary acoustical signals can be provided with this "fingerprint", thereby allowing at the listener a simulation of the acoustic properties of the room associated with the room impulse response. The binaural renderer 236 may be programmed or configured for rendering the output channels into two binaural channels using head related transfer functions or binaural room impulse responses (BRIR). For example, for mobile devices binaural rendering is desired for headphones or loudspeakers attached to such mobile devices. In such mobile devices, due to constraints it may be useful to limit the decoder and rendering complexity. In addition to omitting decorrelation in such processing scenarios, it may be advantageous to first perform a downmix using a downmixer 250 to an intermediate downmix signal 252, i.e., to a lower number of output channels which results in a lower number of input channel for the actual binaural converter 254. For example, a 22.2 channel material may be downmixed by the downmixer 250 to a 5.1 intermediate downmix or, alternatively, the intermediate downmix may be directly calculated by the SAOC decoder 220 in FIG. 2 in a kind of a "shortcut" mode. The binaural rendering then only has to apply ten HRTFs (Head Related Transfer Functions) or BRIR functions for rendering the five individual channels at different positions in contrast to applying 44 HRTF or BRIR functions if the 22.2 input channels were to be directly rendered. The convolution operations that may be used for the binaural rendering involve a lot of processing power and, therefore, reducing this processing power while still obtaining an acceptable audio quality is particularly useful for mobile devices. The binaural renderer 236 produces a binaural downmix 238 of the multichannel audio material 228, such that each input channel (excluding the LFE channels) is represented by a virtual sound source. The processing may be conducted frame-wise in QMF domain. The binauralization is based on measured binaural room impulse responses, and the direct sound and early reflections may be imprinted to the audio material via a convolutional approach in a pseudo-FFT domain using a fast convolution on-top of the QMF domain, while late reverberation may be processed separately.

FIG. 5 shows an example of a room impulse response h(t) 300. The room impulse response comprises three components, the direct sound 301, early reflections 302 and late reverberation 304. Thus, the room impulse response describes the reflection behavior of an enclosed reverberant acoustic space when an impulse is played. The early reflections 302 are discrete reflections with increasing density, and the part of the impulse response where the individual reflections can no longer be discriminated is called late reverberation 304. The direct sound 301 can be easily identified in the room impulse response and can be separated from early reflections, however, the transition from the early reflection 302 to late reverberation 304 is less obvious.

In the following embodiments of the inventive approach will be described in further detail. In accordance with embodiments of the invention, an audio signal is separately processed with an early part and a late reverberation of a room impulse response. The audio signal processed with the early part of the room impulse response and the reverberated signal are combined and output as the output audio signal. For the separate processing the transition in the room impulse response from the early part to the late reverberation needs to be known. The transition is determined by a correlation measure that reaches a threshold, wherein the threshold is set dependent on the correlation measure for a selected one of the early reflections in the early part of the room impulse response. The correlation measure may describe with regard to the room impulse response the similarity of the decay in acoustic energy including the initial state and the decay in acoustic energy starting at any time following the initial state over a predefined frequency range.

In accordance with embodiments, the separate processing of the audio signal comprises processing the audio signal with the early reflection part 301, 302 of the room impulse response during a first process, and processing the audio signal with the diffuse reverberation 304 of the room impulse response during a second process that is different and separate from the first process. Changing from the first process to the second process occurs at the transition time. In accordance with further embodiments, in the second process the diffuse (late) reverberation 304 may be replaced by a synthetic reverberation. In this case the room impulse response provided may contain only the early reflection part 301, 302 (see FIG. 5) and the late diffuse reverberation 304 is not included.

Figure 6A:
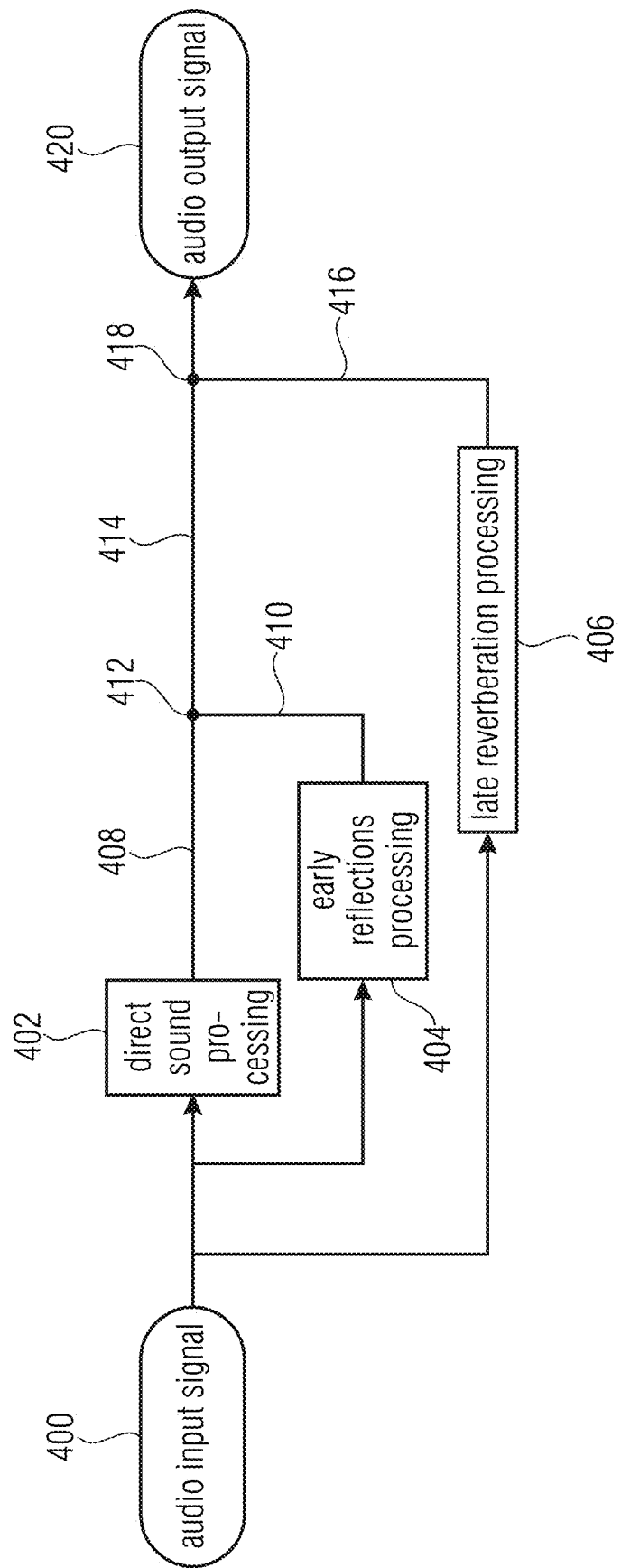
FIG. 6(A) illustrates a block diagram of a signal processing unit (e.g. in a binaural renderer of FIG. 4) for separately processing an audio signal with an early part and a late reverberation of the room impulse in accordance with an embodiment of the invention.

FIG. 6(A) shows a block diagram illustrating a first exemplary signal processing unit for separately processing an audio signal with an early part and a late reverberation of the room impulse in accordance with an embodiment of the invention. The processing of the audio signal in accordance with different parts of the room impulse response may be carried out in a binaural renderer 236 that has been described above. The audio input signal 400 may be a non-reverberant audio material, e.g. a multichannel audio input signal, that is convolved with the room impulse response, for example a room impulse response measured using an artificial head or in-ear microphones. This convolution allows to gain a spatial impression of the original non-reverberant audio material as if the audio material is listened to in the room associated with room impulse response. For example, in the above mentioned binaural renderer 236, it may be desired to process the audio signal with the direct sound 301 and the early reflection 302 in the room impulse response and to process the audio signal with the late reverberation 304 separately. For processing the audio input signal 400, a block 402 for direct sound processing, a block 404 for early reflections processing and a block 406 for late reverberation processing are provided. The output signals 408 and 410 of the respective blocks 402 to 406 are combined by a first adder 412 for generating an early processed signal 414. The early processed signal 414 and the reverberated signal 416 provided by processor 406 are combined by a second adder 418 for generating the audio output signal 420 which provides to a listener the impression as if the audio signal is listened to in the room associated with the room impulse responses.

Processing the late reverberation 302 separate from the direct sound and early reflections is advantageous due to the reduced computational complexity. More specifically, using a convolution for the entire impulse response is computationally very costly. Therefore, reverberation algorithms with lower complexity are typically used to process audio signals in order to simulate late reverberation. The direct sound and early reflections part of the impulse response are computed more accurately, for example by a convolution. A further advantage is the possibility of reverberation control. This allows the late reverberation to be modified dependent, for example, on a user input, a measured room parameter or dependent on the contents of the audio signal. To achieve the above advantages the transition (e.g., the point in time) where the early reflections 302 end and where the late reverberation 304 starts needs to be known. When the late reverberation processing starts too early, the audio signal may be of lower quality as the human hearing can detect the missing distinct early reflections. On the other hand, if the transition time is detected too late, the computational efficiency will not be exploited, as the early reflections processing is typically more costly than the late reverberation processing. The transition, e.g., in time domain samples, may be fed to the binaural renderer as an input parameter which will then, dependent on the received transition, control the processors 402 to 406 for separately processing the audio signal.

Figure 6B:
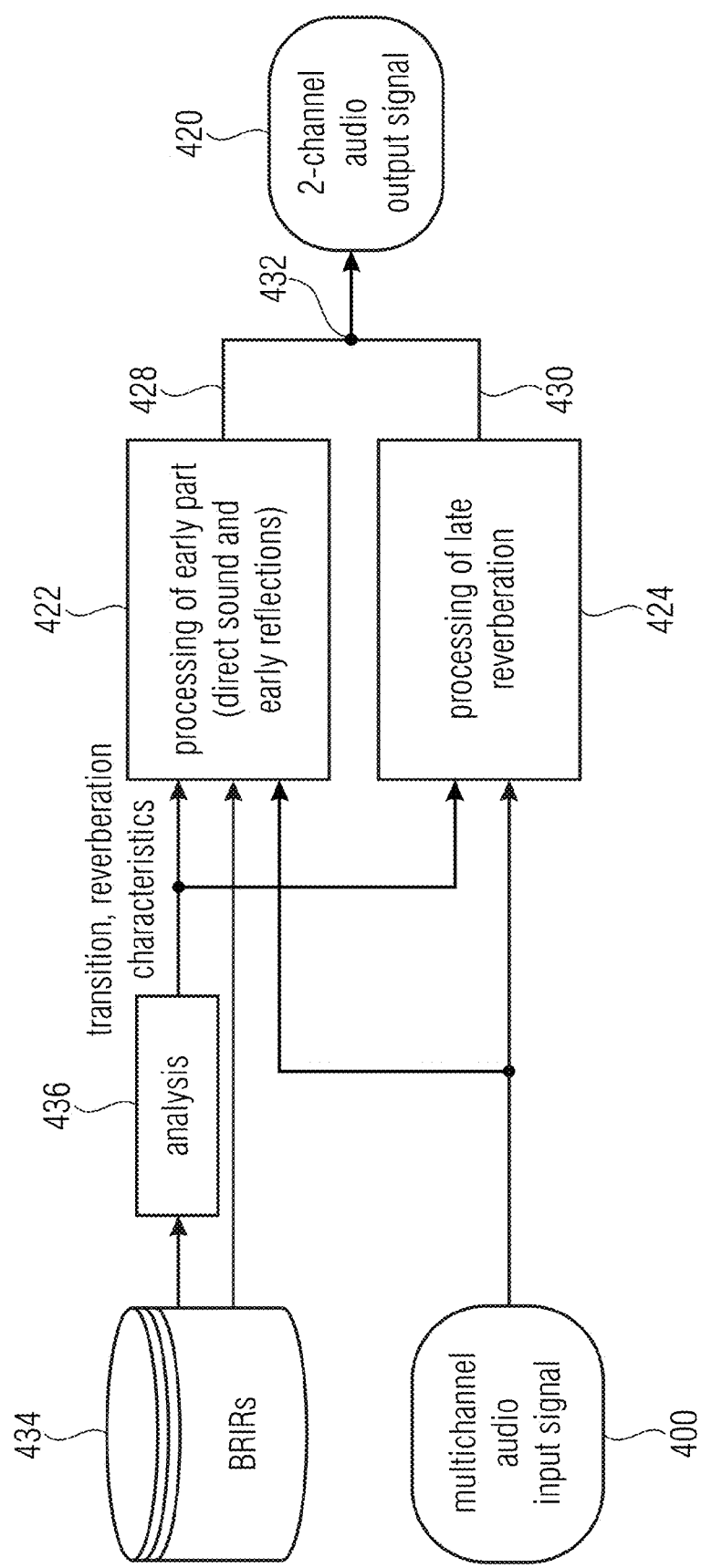
FIG. 6(B) illustrates a block diagram of another signal processing unit (e.g. in a binaural renderer of FIG. 4) for separately processing an audio signal with an early part and a late reverberation of the room impulse in accordance with a further embodiment of the invention.

FIG. 6(B) illustrates a block diagram of another exemplary signal processing unit for separately processing an audio signal with an early part and a late reverberation of the room impulse in accordance with another embodiment of the invention. The input signal 400, for example a multichannel audio input signal, is received and applied to a first processor 422 for processing the early part, namely for processing the audio signal in accordance with the direct sound 301 and the early reflections 302 in the room impulse response 300 shown in FIG. 5. The multichannel audio input signal 400 is also applied to a second processor 424 for processing the audio signal in accordance with the late reverberation 304 of the room impulse response. In a binaural renderer, as mentioned above, it may be desired to process the direct sound and early reflections separate from the late reverberation, mainly because of the reduced computational complexity. The processing of the direct sound and early reflections may, for example, be imprinted to the audio signal by a convolutional approach carried out by the first processor 422, while the late reverberation may be replaced by a synthetic reverberation provided by the second processor 424. The overall binaural output signal 420 is then a combination of the convolutional result 428 provided by the processor 422 and the synthetic reverberated signal 430 provided by the processor 424. In accordance with embodiments the signals 428 and 430 are combined by an adder 432 outputting the overall binaural output signal 420.

As mentioned, the first processor 422 may cause a convolution of the audio input signal 400 with a direct sound and early reflections of the room impulse response that may be provided to the first processor 422 from an external database 434 holding a plurality of recorded binaural room impulse responses. The second processor or reverberator 424 may operate on the basis of reverberator parameters, like the reverberation RT60 and the reverberation energy, that may be obtained from the stored binaural room impulse responses by an analysis 436. It is noted that the analysis 436 is not necessarily part of the renderer, rather this is to indicate that from the respective responses stored in database 434 the respective reverberation parameters may be derived; this may be done externally. The reverberator parameters may be determined, for example, by calculating the energy and the RT60 reverberation time in an octave or one-third octave filterbank analysis, or may be mean values of the results of multiple impulse response analyses.

In addition, both processors 422 and 424 receive from the database 434—directly or via the analysis 436—as input parameter also information about the transition in the room impulse response from the early part to the late reverberation. The transition may be determined in a way as will be described in further detail below.

In accordance with embodiments, the transition analysis may be used to separate the early reflections and the late reverberation. It may be fed to the binaural renderer as an input parameter (e.g., it may be read from a dedicated file/interface along with RT60-values and energy values that are used to configure the reverberator). The analysis may be based on one set of binaural room impulse responses (a set of BRIR pairs for a multitude of azimuth and elevation angles). The analysis may be a preprocessing step that is carried out separately for every impulse response and then the median of all transition values is taken as an overall transition value of the one BRIR set. This overall transition value may then be used to separate the early reflections from the late reverberation in the calculation of the binaural output signal.

Several approaches for determining the transition are known, however, these approaches are disadvantages as will be described now. In conventional-technology reference [1] a method is described which uses the energy decay relief (EDR) and a correlation measure to determine the transition time from early reflections to late reverberation. However, the approach described in conventional-technology reference [1] is disadvantageous.

1. The approach is strongly dependent on the azimuthal angle of the binaural impulse response and the relation between the amplitudes of direct sound and first impinging reflection.

2. The transition time is calculated in arbitrary frequency bands. There is no general knowledge about which of the frequency bands gives the right transition time to be used for the overall impulse response.
3. There is no information about the essential correlation step of the approach.

Another known approach is to describe early reflections by the dispersion of echoes in a space, for example by the average number of reflections per second, and to determine the beginning of the late reverberation when this number exceeds a predefined threshold (see conventional-technology reference [2]). This approach relies on the room characteristic, namely the room volume, which is often unknown. The room volume cannot be easily extracted from a measured impulse response. Therefore, this method is not applicable for the calculation of the transition from measured impulse responses. Also, there is no common knowledge how dense the reflections have to be to be called late reverberation.

Another possibility, described in conventional-technology reference [3], is to compare the actual distribution at a time in an impulse response window to a Gaussian distribution in the time domain. The late reverberation is assumed to have a normal distribution. In a normal distribution approximately one third (exactly 1/e) of the samples lie outside one standard deviation of the mean and two thirds of the samples are within one standard deviation of the mean. Distinct early reflections have more samples within one standard deviation and fewer outside. The ratio of samples outside one standard deviation versus the samples inside one standard deviation may be used to define the transition time. However, the disadvantage of this approach is that the transition is difficult to define with this measure, because the ratio sometimes fluctuates around the threshold. The measure is also strongly dependent on the size and the type of the sliding window in which the ratio is calculated.

Besides the above mentioned approaches, also the Kurtosis (the higher order cumulant of a stochastic signal) may be used to determine the transition time. It rapidly decreases when approaching towards the late part of the impulse response, as is outlined in conventional-technology reference [4]. However, the definition of the threshold for the transition (either use of a rapid decrease or the time when it first reaches zero) is not clear.

There is yet another approach that does not rely on the analysis of a measured impulse response, but on the room volume, as is described in [2]. This approach assumes that the transition time is only dependent on the volume, but it does not take into account the diffusing properties of the boundaries. Therefore, the result can only be an approximation of the transition time and is not as accurate as needed for avoiding the above mentioned disadvantages when not precisely determining the transition time. Further, the volume of a room is often not known and cannot be easily extracted from a measured impulse response.

Other known approaches completely disregard the environment and define the transition time to be simply 80 ms, see for example in conventional-technology reference [5]. This number, however, is totally detached from the room characteristics or a measured impulse response and, therefore, is much too inaccurate for the purpose of separating late reverberation from the reminder of the impulse response.

The present invention, in accordance with embodiments, provides in addition to the improved audio signal processing also an improved approach for determining the transition time between early reflections and late reverberation in a room impulse response yielding a more accurate determination of the transition time. Embodiments, as will be described below, provide a simple and effective possibility to calculate the transition time from a measured impulse response using an FFT analysis.

Figure 7:
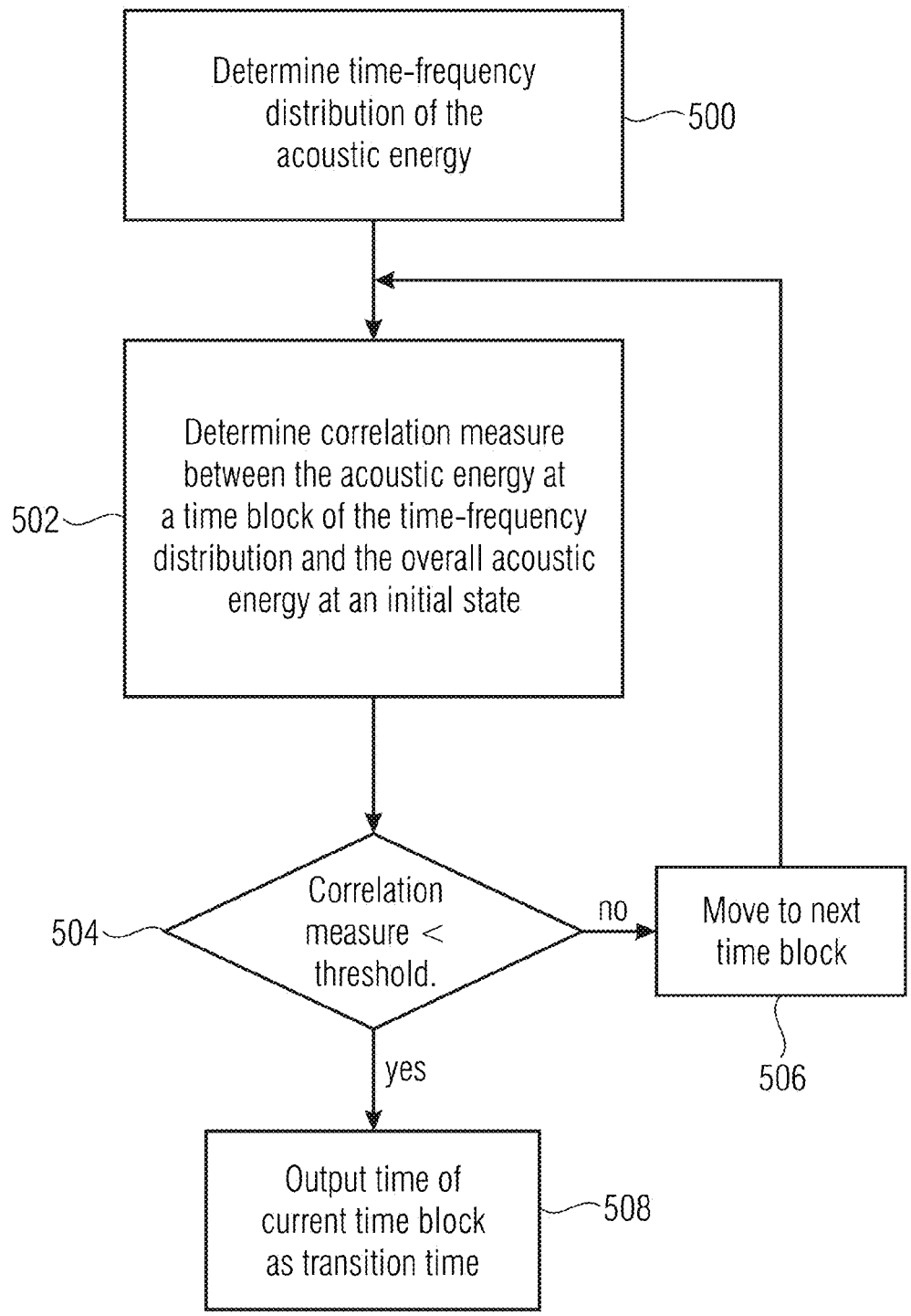
FIG. 7 illustrates a flow diagram of an approach for determining a transition time between early reflections and late reverberation in a room impulse response in accordance with an embodiment of the invention.

FIG. 7 shows a flow diagram of an approach for determining a transition time between early reflections and late reverberation in a room impulse response in accordance with an embodiment of the invention. To determine the transition time from early reflections to late reverberation, in a first step 500 a time-frequency distribution of the acoustic energy is determined. For example, in accordance with embodiments the energy decay relief (E(t,f), EDR) may be calculated in step 500. The EDR can be directly calculated from a measured (e.g., binaural) room impulse response and may be interpreted as a frequency-domain expansion of the commonly used energy decay curve (Schroeder integration, EDC (d)) that shows the remaining energy in the impulse response after a time t. Instead of using the broadband impulse response, the EDR is derived from a time-frequency representation and many different time-frequency representations may be used for this purpose. Once the time-frequency distribution of the acoustic energy has been determined in step 500, in step 502 a correlation measure between the acoustic energy at a time block of the time-frequency distribution and the overall acoustic energy at an initial state is determined. In step 504 it is determined as to whether the correlation measure reaches a defined threshold (e.g., falls below the defined threshold) or not. If it does not reach the threshold, the method proceeds to step 506 where the next time block and the distribution following the current time block is selected and steps 502 and 504 are repeated for the next time block. Thus, in accordance with steps 502 to 506 a correlation measure is used to calculate the correlation value between each time block of the EDR determined in step 500 with the overall energy at the initial state. The transition time is reached when the correlation measure reaches the defined threshold (e.g., falls below the defined threshold). In other words, when it is determined in step 504 that for a current time block the correlation measure is lower than the threshold, the method proceeds to step 508 where the time of the current time block is output as the transition time.

In the following, an embodiment of the inventive approach will be described in further detail. Initially, a measured binaural impulse response may be taken as an input for the calculation of the transition time. Then, a Page or Levin distribution is employed for the calculation of the energy decay relief (EDR). The Page distribution refers to the derivative of the past running spectrum and the Page distribution of the time-reverse signal is called the Levin distribution (see also conventional-technology reference [2]). This distribution describes an instantaneous power spectrum, and the EDR of the impulse response h(t) (see, for example, FIG. 5) is calculated as follows:

$$E(t,\omega) = |\int_t^\infty h(\tau)e^{-j\omega\tau}d\tau|^2$$

where $E(t,\omega)$=energy decay relief,
$h(\tau)$=room impulse response,
$\omega=2\pi f$.

The calculation in accordance with the above equation starts at the direct sound 301 (see FIG. 5), and with increasing time the energy decay relief contains less distinct reflections and more stochastic reverberation. In accordance with the described embodiment, the energy decay relief is calculated for time blocks having a length of 1 ms for ease of computation. By means of the above described functionality, the time-frequency distribution of the acoustic energy is determined as has been described with regard to step 500 in FIG. 7.

Following this, as has been described with regard to steps 502 to 506 in FIG. 7, the correlation measure ρ(t) that is based on the Pearson's Product-Moment Correlation (also known as correlation coefficient) is determined. More specifically, the correlation of the acoustic energy for each time block with the overall energy at the initial state is determined, in accordance with embodiments, as follows:

$$\rho(t) = \frac{\sum_\omega (E(1,\omega) - \overline{E}(1,\omega)) \cdot \sum_\omega (E(t,\omega) - \overline{E}(t,\omega))}{\sqrt{\sum_\omega (E(1,\omega) - \overline{E}(1,\omega))^2} \cdot \sqrt{\sum_\omega (E(t,\omega) - \overline{E}(t,\omega))^2}}$$

where

E(1,ω)=full frequency range energy decay relief at frequency f, $\overline{E}$(1,ω)=mean value over all frequencies of the initial full range energy decay relief, E(t,ω)=energy decay relief at frequency f starting a time t, $\overline{E}$(t,ω)=mean value over all frequencies of the full range energy decay relief starting at time t, ω=2πf The above correlation describes the similarity of the decay including the initial state and the decay starting at any time t. It is calculated from the broadband EDR, using the full frequency range of the EDR for the calculation, thereby comparing the complete initial energetic situation with the situation at the time t.

The present invention is not limited to the calculation of the correlation over all frequencies. Rather, the correlation may also be calculated over a predefined frequency range. The frequency range may be determined from the audio signal to be processed. For example, for specific audio signals the frequency range may be limited to a predefined range, e.g., the range of audible frequencies. In accordance with embodiments, the frequency range may be 20 Hz to 20 kHz. It is noted that other ranges may also be selected, e.g. by empirical studies.

In accordance with an embodiment, an effective FFT-based implementation of the EDR may be used. A window having an effective length of the measured impulse response is applied, and it is assumed that a measured impulse response has an effective length of $2^{13}$ which is equal to 8192 frequency bins. During the calculation, this window is shifted by the discrete length of a single time block, and the end of the window is zero-padded. In accordance with embodiments a time block length of 1 ms is used, and for a simple and effective calculation of the EDR the following approach is applied:

(1) The whole effective length of the measured impulse response is taken to calculate the FFT spectrum, and the absolute values are squared yielding E(1,ω).
(2) Until the end of the impulse response is reached, the window is moved by the discrete time-block length of 1 ms towards the end of the impulse response, the windowed samples are zero-padded to the effective length (i.e., those samples beyond the effective length are made zero), and then the FFT spectrum is calculated which yields E(t,ω).

Figure 8:
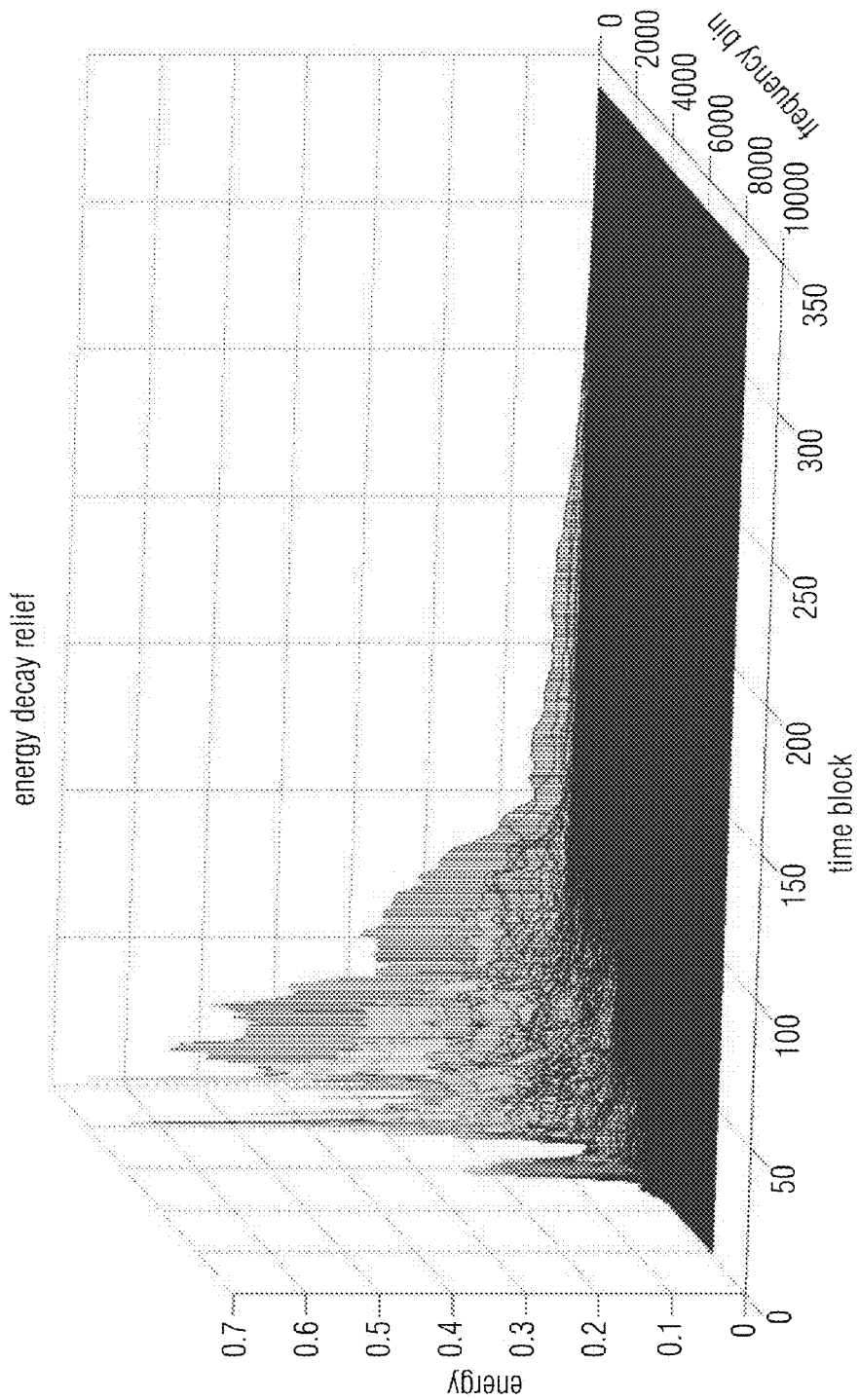
FIG. 8 illustrates the energy decay relief (EDR) achieved for an impulse response determined in accordance with an FFT-based approach.

The above approach is advantageous as no additional filter bank or the like is required for the narrow band calculation of the EDR; only a shifting of the window may be used. FIG. 8 shows an example for an energy decay relief achieved for an impulse response in accordance with the above described FFT-based approach.

As has been described in FIG. 7 with regard to steps 504 and 508, the correlation determined in the above described way will then be compared to a predefined threshold. The smaller the threshold is, the more the transition time moves towards the end of the impulse response. For example, for binaural impulse responses, if the threshold is chosen to be 1/e≈0.3679 (see also conventional-technology reference [2]), the transition is too early at some azimuthal angles, because the correlation falls below the threshold already before the first reflection occurred or impinged. However, since it is known that the transition time is later than the arrival time of the first reflection, because the first reflection is clearly distinct and can for sure not be the late diffuse reverberation, in accordance with embodiments, the threshold is not defined as a fixed threshold. Rather, in accordance with the inventive approach the threshold is defined such that it is dependent on the correlation at the impinging time of the first reflection. Wth this definition, it is assured that the first reflection is located before the transition time. In accordance with embodiments, the transition time, as shown in step 508, is considered to be reached when the following applies:

ρ(t)=c·ρ($t_F$)

where

ρ($t_F$)=correlation measure for the selected one of the early reflections, $t_F$=time index where the selected one of the early reflections after the direct sound impinges, c=the constant value that is based on $$\frac{1}{e},$$

e being the Euler number.

In accordance with embodiments, the constant value may be $$\frac{1}{e},$$

however, the present invention is not limited to this value. In accordance with embodiments the constant value may be approximated by $$\frac{1}{e},$$

e.g. by rounding or truncating $$\frac{1}{e}$$

with respect to a predefined decimal place (see below).

In the described embodiment, $t_F$ is the time block index where the first reflection after the direct sound impinges.

Figure 9:
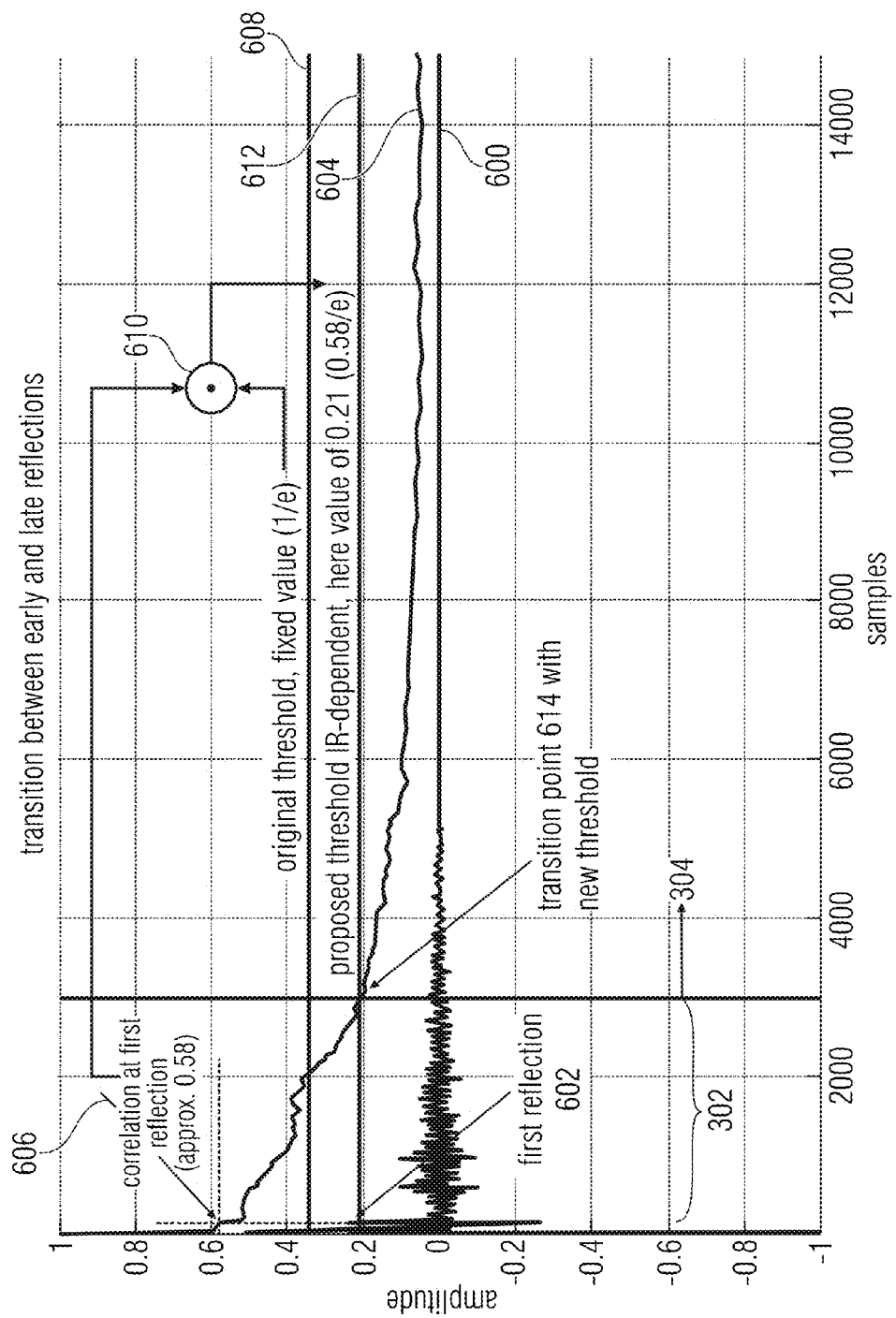
FIG. 9 illustrates the transition time determination in accordance with an embodiment of the invention.

FIG. 9 depicts the transition time determination in accordance with the inventive approach where the threshold is calculated dependent on the impulse response by multiplication of the correlation at the impinging point of the first reflection and a fixed or constant value of 1/e.

Figure 10:
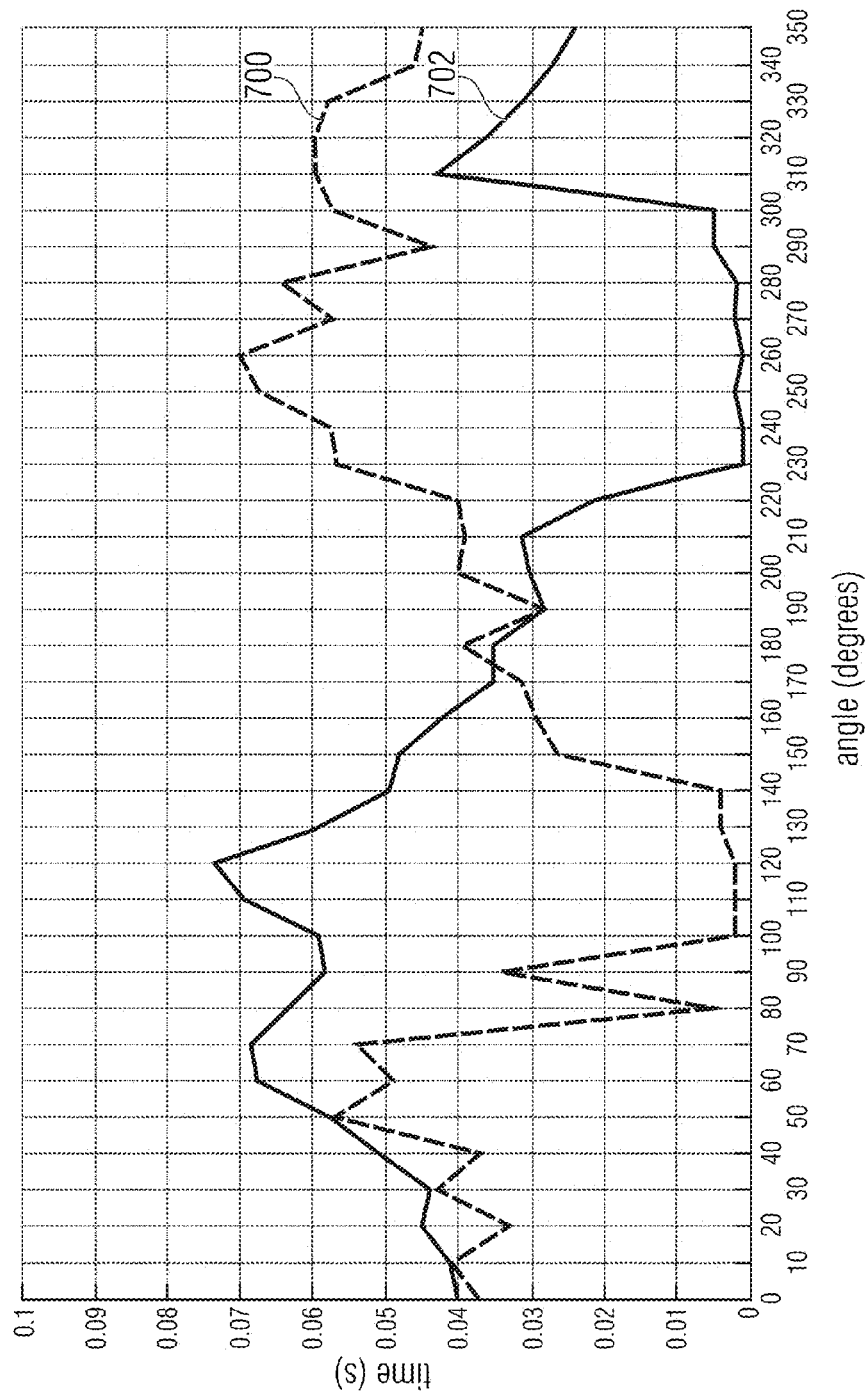
FIG. 10 illustrates the transition times for a left channel and a right channel for a measured binaural room impulse response determined using a conventional approach.
Figure 11:
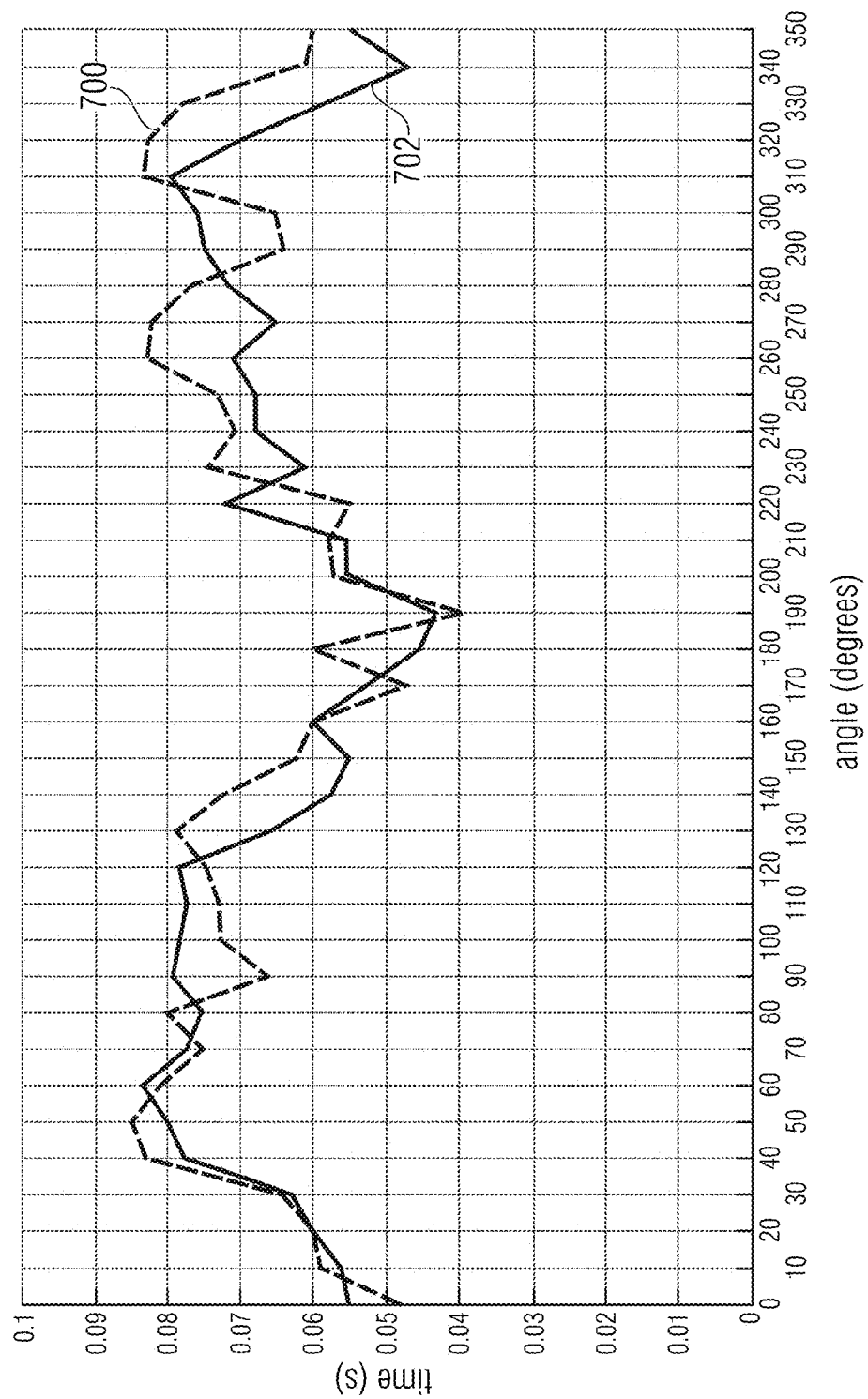
FIG. 11 illustrates the transition times for a left channel and a right channel for a measured binaural room impulse response determined using the inventive approach.

The amplitude of the room impulse response 600 is shown over the number of samples, and a first reflection 602 is also indicated. The waveform 604 indicates the correlation values obtained by applying equation (2). At 606 the correlation value at the first reflection is shown which, in the example depicted has a value of 0.58. Also, the conventionally used fixed threshold of 1/e is shown at 608. The correlation value 606 for the first reflection and the original fixed value 1/e are applied to a multiplier 610 which generates the new threshold that is dependent on the correlation value at the first reflection and, in the described embodiment has a value of 0.21 as is shown at 612. Thus, when compared to conventional approaches, the transition point 614 is moved further towards the right so that all samples following the transition point 614 are now considered late reverberation 304 and all samples before are considered early reflection 302. It can be seen that the resulting decision time 614 is more robust. For example, in a binaural room impulse response this means that the calculated transition time is much more stable over the azimuthal angle. This can be seen from a comparison of FIGS. 10 and 11. FIG. 10 shows the transition times when applying the approach described in conventional-technology reference [1] for the left channel 700 and the right channel 702 for a measured binaural room impulse response using the above described EDC implementation but with a fixed threshold of 1/e. A dependency on the ear and the azimuthal angle is clearly visible as well as the deep dips in the transition time down to less than 10 ms that are due to the fact that the correlation $\rho(t)$ falls below the threshold before the first reflection impinges. FIG. 11 shows the transition time for the left channel 700 and the right channel 702 when calculated in accordance with the inventive approach. It can be seen that the resulting transition time is much less dependent on the ear and the azimuthal angle when compared to the conventional approach explained with regard to FIG. 10.

In accordance with embodiments, the transition time is considered to be reached when the correlation falls below or is equal to the threshold value for the first time and does not increase again over the threshold afterwards. The time value that is associated with this sample in the calculated correlation function is the time where the late reverberation of the impulse response is considered to start. In accordance with the inventive approach, the impinging time of the first reflection may be determined by a running kurtosis operator, as is described in conventional-technology reference [6]. Alternatively, the first reflection may be detected by other methods, for example, by a threshold detection or by an attack detection as it is, for example, described in conventional-technology reference [7].

In accordance with embodiments, $e^{-1}=0.3679$ is used as a value to indicate a low correlation in stochastic processes as is, for example, indicated also in conventional-technology reference [1]. In accordance with embodiments, this value is used with four decimal digits such that $e^{-1}$ is approximated as 0.3679. In accordance with other embodiments also more or less decimal digits may be used and it has been observed that the detected transition time changes accordingly with the deviation from the exact number of $e^{-1}$. For example, when using value of 0.368 this results only in minimal changes in the transition time of below 1 ms.

In accordance with further embodiments, the impulse response may be band-limited, and in this case, the EDR may be calculated over a limited frequency range and also the correlation may be calculated over the limited frequency range of the EDR. Alternative frequency transforms or filter banks may also be used, for example, approaches operating completely in the FFT domain, thereby saving additional transforms, for example when using FFT based filtering/convolution.

It is noted that in the above description of the embodiments reference has been made to a value of the correlation value for the first reflection. However, other embodiments may use a correlation value calculated for another one of the early reflections.

As mentioned above, the inventive approach, in accordance with embodiments may be used in a binaural processor for binaural processing of audio signals. In the following an embodiment of binaural processing of audio signals will be described. The binaural processing may be carried out as a decoder process converting the decoded signal into a binaural downmix signal that provides a surround sound experience when listened to over headphones.

Figure 12:
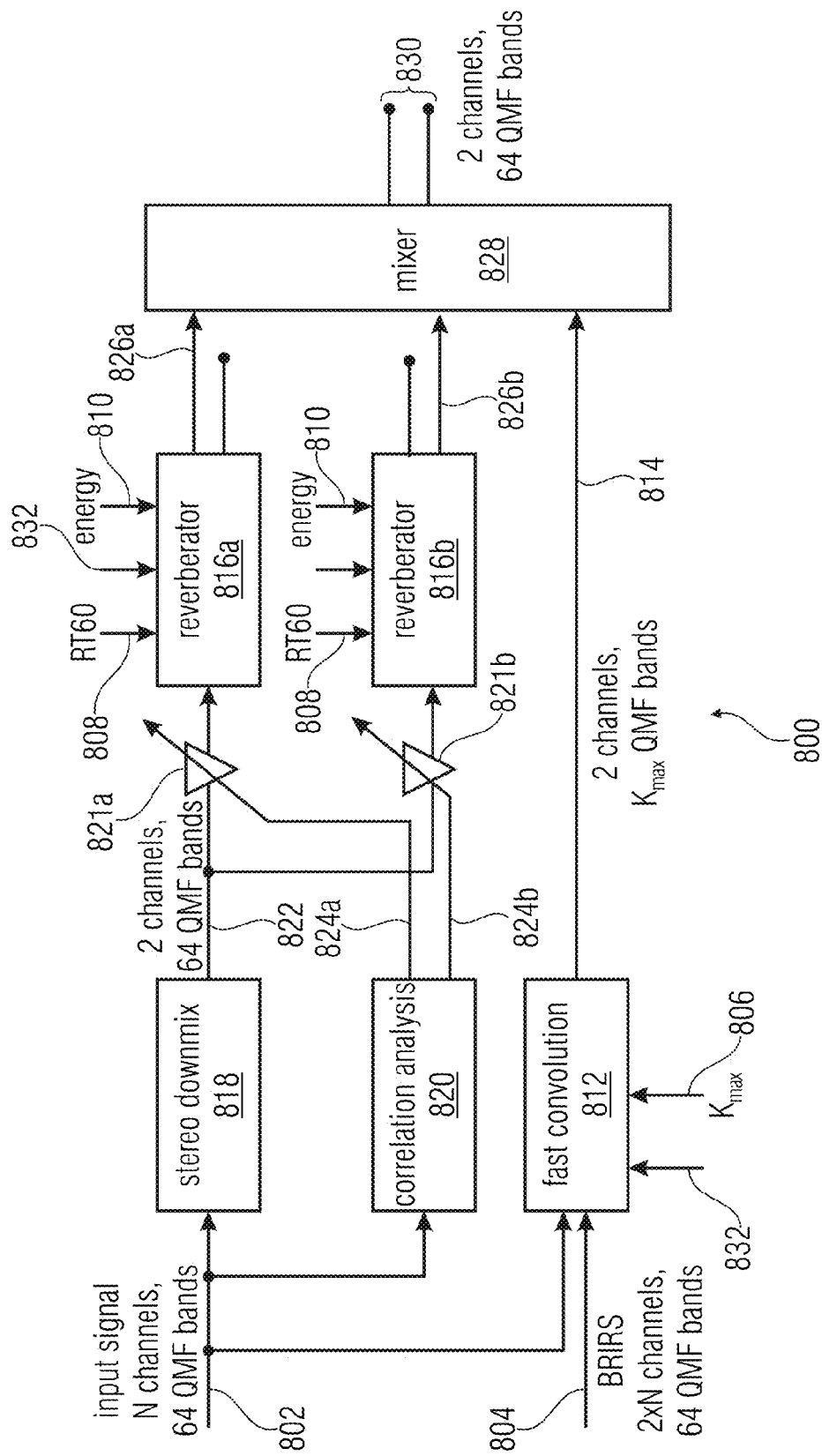
FIG. 12 schematically illustrates the binaural processing of audio signals in a binaural renderer for in accordance with an embodiment of the present invention.

FIG. 12 shows a schematic representation of a binaural renderer 800 for binaural processing of audio signals in accordance with an embodiment of the present invention. FIG. 12 also provides an overview of the QMF domain processing in the binaural renderer. At an input 802 the binaural renderer 800 receives the audio signal to be processed, e.g., an input signal including N channels and 64 QMF bands. In addition the binaural renderer 800 receives a number of input parameters for controlling the processing of the audio signal. The input parameters include the binaural room impulse response (BRIR) 804 for 2×N channels and 64 QMF bands, an indication $K_{max}$ 806 of the maximum band that is used for the convolution of the audio input signal with the early reflection part of the BRIRs 804, and the reverberator parameters 808 and 810 mentioned above (RT60 and the reverberation energy). The binaural renderer 800 comprises a fast convolution processor 812 for processing the input audio signal 802 with the early part of the received BRIRs 804. The processor 812 generates at an output the early processed signal 814 including two channels and $K_{max}$ QMF bands. The binaural renderer 800 comprises, besides the early processing branch having the fast convolution processor 812, also a reverberation branch including two reverberators 816a and 816b each receiving as input parameter the RT60 information 808 and the reverberation energy information 810. The reverberation branch further includes a stereo downmix processor 818 and a correlation analysis processor 820 both also receiving the input audio signal 802. In addition, two gain stages 821a and 821b are provided between the stereo downmix processor 818 and the respective reverberators 816a and 816b for controlling the gain of a downmixed signal 822 provided by the stereo downmix processor 818. The stereo downmix processor 818 provides on the basis of the input signal 802 the downmixed signal 822 having two bands and 64 QMF bands. The gain of the gain stages 821a and 821b is controlled by a respective control signals 824a and 824b provided by the correlation analysis processor 820. The gain controlled downmixed signal is input into the respective reverberators 816a and 816b generating respective reverberated signals 826a, 826b. The early processed signal 814 and the reverberated signals 826a, 826b are received by a mixer 828 that combines the received signals into the output audio signal 830 having two channels and 64 QMF bands. In addition, in accordance with the present invention, the fast convolution processor 812 and the reverberators 816a and 816b receive an additional input parameter 832 indicating the transition in the room impulse response 804 from the early part to the late reverberation determined as discussed above.

The binaural renderer module 800 (e.g., the binaural renderer 236 of FIG. 2 or FIG. 4) has as input 802 the decoded data stream. The signal is processed by a QMF analysis filterbank as outlined in ISO/IEC 14496-3:2009, subclause 4.B.18.2 with the modifications stated in ISO/IEC 14496-3:2009, subclause 8.6.4.2. The renderer module 800 may also process QMF domain input data; in this case the analysis filterbank may be omitted. The binaural room impulse responses (BRIRs) 804 are represented as complex QMF domain filters. The conversion from time domain binaural room impulse responses to the complex QMF filter representation is outlined in ISO/IEC FDIS 23003-1:2006, Annex B. The BRIRs 804 are limited to a certain number of time slots in the complex QMF domain, such that they contain only the early reflection part 301, 302 (see FIG. 5) and the late diffuse reverberation 304 is not included. The transition point 832 from early reflections to late reverberation is determined as described above, e.g., by an analysis of the BRIRs 804 in a preprocessing step of the binaural processing. The QMF domain audio signals 802 and the QMF domain BRIRs 804 are then processed by a bandwise fast convolution 812 to perform the binaural processing. A QMF domain reverberator 816a, 816b is used to generate a 2-channel QMF domain late reverberation 826a, 826b. The reverberation module 816a, 816b uses a set of frequency-dependent reverberation times 808 and energy values 810 to adapt the characteristics of the reverberation. The waveform of the reverberation is based on a stereo downmix 818 of the audio input signal 802 and it is adaptively scaled 821a, 821b in amplitude depending on a correlational analysis 820 of the multi-channel audio signal 802. The 2-channel QMF domain convolutional result 814 and the 2-channel QMF domain reverberation 816a, 816b are then combined 828 and finally, two QMF synthesis filter banks compute the binaural time domain output signals 830 as outlined in ISO/IEC 14496-3:2009, subclause 4.6.18.4.2. The renderer can also produce QMF domain output data; the synthesis filterbank is then omitted.

Definitions

Audio signals 802 that are fed into the binaural renderer module 800 are referred to as input signals in the following. Audio signals 830 that are the result of the binaural processing are referred to as output signals. The input signals 802 of the binaural renderer module 800 are audio output signals of the core decoder (see for example signals 228 in FIG. 2). The following variable definitions are used:

| | |
|---|---|
| $N_{in}$ | Number of input channels |
| $N_{out}$ | Number of output channels, $N_{out} = 2$ |
| $M_{DMX}$ | Downmix matrix containing real-valued non-negative downmix coefficients (downmix gains). $M_{DMX}$ is of dimension $N_{out} \times N_{in}$ |
| L | Frame length measured in time domain audio samples. |
| v | Time domain sample index |
| n | QMF time slot index (subband sample index) |
| $L_n$ | Frame length measured in QMF time slots |
| F | Frame index (frame number) |
| K | Number of QMF frequency bands, K = 64 |
| k | QMF band index (1 . . . 64) |
| A, B, ch | Channel indices (channel numbers of channel configurations) |
| $L_{trans}$ | Length of the BRIR's early reflection part in time domain samples |
| $L_{trans,n}$ | Length of the BRIR's early reflection part in QMF time slots |
| $N_{BRIR}$ | Number of BRIR pairs in a BRIR data set |

-continued

| | |
|---|---|
| $L_{FFT}$ | Length of FFT transform |
| $\Re(\cdot)$ | Real part of a complex-valued signal |
| $\Im(\cdot)$ | Imaginary part of a complex-valued signal |
| $m_{conv}$ | Vector that signals which input signal channel belongs to which BRIR pair in the BRIR data set |
| $f_{max}$ | Maximum frequency used for the binaural processing |
| $f_{max,decoder}$ | Maximum signal frequency that is present in the audio output signal of the decoder |
| $K_{max}$ | Maximum band that is used for the convolution of the audio input signal with the early reflection part of the BRIRs |
| a | Downmix matrix coefficient |
| $c_{eq,k}$ | Bandwise energy equalization factor |
| $\varepsilon$ | Numerical constant, $\varepsilon = 10^{-20}$ |
| d | Delay in QMF domain time slots |
| $\check{y}_{ch}{}^{n',k}$ | Pseudo-FFT domain signal representation in frequency band k |
| n' | Pseudo-FFT frequency index |
| $\check{h}^{n',k}$ | Pseudo-FFT domain representation of BRIR in frequency band k |
| $\check{z}_{ch,conv}{}^{n',k}$ | Pseudo-FFT domain convolution result in frequency band k |
| $\hat{z}_{ch,conv}{}^{n,k}$ | Intermediate signal: 2-channel convolutional result in QMF domain |
| $\tilde{z}_{ch,conv}{}^{n,k}$ | Intermediate signal: 2-channel reverberation in QMF domain |
| $K_{ana}$ | Number of analysis frequency bands (used for the reverberator) |
| $f_{c,ana}$ | Center frequencies of analysis frequency bands |
| $N_{DMX,act}$ | Number of channels that are downmixed to one channel of the stereo downmix and are active in the actual signal frame |
| $c_{corr}$ | Overall correlation coefficient for one signal frame |
| $c_{corr}{}^{A,B}$ | Correlation coefficient for the combination of channels A, B |
| $\sigma_{\hat{y}_{ch,A}}{}^{n}$ | Standard deviation for timeslot n of signal $\hat{y}_{ch,A}{}^{n}$ |
| $c_{scale}$ | Vector of two scaling factor |
| $\tilde{c}_{scale}$ | Vector of two scaling factor, smoothed over time |

Processing

The processing of the input signal is now described. The binaural renderer module operates on contiguous, non-overlapping frames of length L=2048 time domain samples of the input audio signals and outputs one frame of L samples per processed input frame of length L.

(1) Initialization and Preprocessing

The initialization of the binaural processing block is carried out before the processing of the audio samples delivered by the core decoder (see for example the decoder of 200 in FIG. 2) takes place. The initialization consists of several processing steps.

(a) Reading of Analysis Values

The reverberator module 816a, 816b takes a frequency-dependent set of reverberation times 808 and energy values 810 as input parameters. These values are read from an interface at the initialization of the binaural processing module 800. In addition the transition time 832 from early reflections to late reverberation in time domain samples is read. The values may be stored in a binary file written with 32 bit per sample, float values, little-endian ordering. The read values that are needed for the processing are stated in the table below:

| Value description | Number | Datatype |
|---|---|---|
| transition length $L_{trans}$ | 1 | Integer |
| Number of frequency bands $K_{ana}$ | 1 | Integer |
| Center frequencies $f_{c,ana}$ of frequency bands | $K_{ana}$ | Float |
| Reverberation times RT60 in seconds | $K_{ana}$ | Float |
| Energy values that represent the energy (amplitude to the power of two) of the late reverberation part of one BRIR | $K_{ana}$ | Float |

(b) Reading and Preprocessing of BRIRs

The binaural room impulse responses 804 are read from two dedicated files that store individually the left and right ear BRIRs. The time domain samples of the BRIRs are stored in integer wave-files with a resolution of 24 bit per sample and 32 channels. The ordering of BRIRs in the file is as stated in the following table:

| Channel number | Speaker label |
|---|---|
| 1 | CH_M_L045 |
| 2 | CH_M_R045 |
| 3 | CH_M_000 |
| 4 | CH_LFE1 |
| 5 | CH_M_L135 |
| 6 | CH_M_R135 |
| 7 | CH_M_L030 |
| 8 | CH_M_R030 |
| 9 | CH_M_180 |
| 10 | CH_LFE2 |
| 11 | CH_M_L090 |
| 12 | CH_M_R090 |
| 13 | CH_U_L045 |
| 14 | CH_U_R045 |
| 15 | CH_U_000 |
| 16 | CH_T_000 |
| 17 | CH_U_L135 |
| 18 | CH_U_R135 |
| 19 | CH_U_L090 |
| 20 | CH_U_R090 |
| 21 | CH_U_180 |
| 22 | CH_L_000 |
| 23 | CH_L_L045 |
| 24 | CH_L_R045 |
| 25 | CH_M_L060 |
| 26 | CH_M_R060 |
| 27 | CH_M_L110 |
| 28 | CH_M_R110 |
| 29 | CH_U_L030 |
| 30 | CH_U_R030 |
| 31 | CH_U_L110 |
| 32 | CH_U_R110 |

If there is no BRIR measured at one of the loudspeaker positions, the corresponding channel in the wave file contains zero-values. The LFE channels are not used for the binaural processing.

As a preprocessing step, the given set of binaural room impulse responses (BRIRs) is transformed from time domain filters to complex-valued QMF domain filters. The implementation of the given time domain filters in the complex-valued QMF domain is carried out according to ISO/IEC FDIS 23003-1:2006, Annex B. The prototype filter coefficients for the filter conversion are used according to ISO/IEC FDIS 23003-1:2006, Annex B, Table B.1. The time domain representation $\tilde{h}_{ch}^v = [\tilde{h}_1^v \ldots \tilde{h}_{N_{BRIR}}^v]$ with $1 \leq v \leq L_{trans}$ is processed to gain a complex valued QMF domain filter $\hat{h}_{ch}^{n,k} = [\hat{h}_1^{n,k} \ldots \hat{h}_{N_{BRIR}}^{n,k}]$ with $1 \leq v \leq L_{trans,n}$.

(2) Audio Signal Processing

The audio processing block of the binaural renderer module 800 obtains time domain audio samples 802 for $N_{in}$ input channels from the core decoder and generates a binaural output signal 830 consisting of $N_{out}=2$ channels. The processing takes as input
the decoded audio data 802 from the core decoder,
the complex QMF domain representation of the early reflection part of the BRIR set 804, and
the frequency-dependent parameter set 808, 810, 832 that is used by the QMF domain reverberator 816a, 816b to generate the late reverberation 826a, 826b.

(a) QMF Analysis of the Audio Signal

As the first processing step, the binaural renderer module transforms L=2048 time domain samples of the $N_{in}$-channel time domain input signal (coming from the core decoder) $[\tilde{y}_{ch,1}^v \ldots \tilde{y}_{ch,N_{in}}^v] = \tilde{y}_{ch}^v$ to an $N_{in}$-channel QMF domain signal representation 802 of dimension $L_n=32$ QMF time slots (slot index n) and K=64 frequency bands (band index k).

A QMF analysis as outlined in ISO/IEC 14496-3:2009, subclause 4.B.18.2 with the modifications stated in ISO/IEC 14496-3:2009, subclause 8.6.4.2. is performed on a frame of the time domain signal $\tilde{y}_{ch}^v$ to gain a frame of the QMF domain signal $[\hat{y}_{ch,1}^{n,k} \ldots \hat{y}_{ch,N_{in}}^{n,k}] = \hat{y}_{ch}^{n,k}$ with $1 \leq v \leq L$ and $1 \leq n \leq L_n$.

(b) Fast Convolution of the QMF Domain Audio Signal and the QMF Domain BRIRs

Next, a bandwise fast convolution 812 is carried out to process the QMF domain audio signal 802 and the QMF domain BRIRs 804. A FFT analysis may be carried out for each QMF frequency band k for each channel of the input signal 802 and each BRIR 804.

Due to the complex values in the QMF domain one FFT analysis is carried out on the real part of the QMF domain signal representation and one FFT analysis on the imaginary parts of the QMF domain signal representation. The results are then combined to form the final bandwise complex-valued pseudo-FFT domain signal $$\check{y}_{ch}^{n',k} = \text{FFT}(\hat{y}_{ch}^{n',k}) = \text{FFT}(\Re(\hat{y}_{ch}^{n',k})) + j \cdot \text{FFT}(\Im(\hat{y}_{ch}^{n',k}))$$

and the bandwise complex-valued BRIRs $$\check{h}_1^{n',k} = \text{FFT}(\hat{h}_1^{n',k}) = \text{FFT}(\Re(\hat{h}_1^{n',k})) + j \cdot \text{FFT}(\Im(\hat{h}_1^{n',k}))$$
for the left ear $$\check{h}_2^{n',k} = \text{FFT}(\hat{h}_2^{n',k}) = \text{FFT}(\Re(\hat{h}_2^{n',k})) + j \cdot \text{FFT}(\Im(\hat{h}_2^{n',k}))$$
for the right ear.

The length of the FFT transform is determined according to the length of the complex valued QMF domain BRIR filters $L_{trans,n}$ and the frame length in QMF domain time slots $L_n$ such that $$L_{FFT} = L_{trans,n} + L_n - 1.$$

The complex-valued pseudo-FFT domain signals are then multiplied with the complex-valued pseudo-FFT domain BRIR filters to form the fast convolution results. A vector $m_{conv}$ is used to signal which channel of the input signal corresponds to which BRIR pair in the BRIR data set.

This multiplication is done bandwise for all QMF frequency bands k with $1 \leq k \leq K_{max}$. The maximum band $K_{max}$ is determined by the QMF band representing a frequency of either 18 kHz or the maximal signal frequency that is present in the audio signal from the core decoder $$f_{max} = \min(f_{max,decoder}, 18 \text{ kHz}).$$

The multiplication results from each audio input channel with each BRIR pair are summed up in each QMF frequency band k $1 \leq k \leq K_{max}$ resulting in an intermediate 2-channel $K_{max}$-band pseudo-FFT domain signal.

$$\check{z}_{ch,1,conv}^{n',k} = \sum_{ch=1}^{ch=N_{in}} \check{y}_{ch,ch}^{n',k} \cdot \check{h}_{1,m_{conv}[ch]}^{n',k} \text{ and } \check{z}_{ch,2,conv}^{n',k} = \sum_{ch=1}^{ch=N_{in}} \check{y}_{ch,ch}^{n',k} \cdot \check{h}_{2,m_{conv}[ch]}^{n',k}$$

are the pseudo-FFT convolution result $\check{z}_{ch,conv}^{n',k} = [\check{z}_{ch,1,conv}^{n',k}, \check{z}_{ch,2,conv}^{n',k}]$ in the QMF domain frequency band k.

Next, a bandwise FFT synthesis is carried out to transform the convolution result back to the QMF domain resulting in an intermediate 2-channel $K_{max}$-band QMF domain signal with $L_{FFT}$ time slots $\hat{z}_{ch,conv}^{n,k} = [\hat{z}_{ch,1,conv}^{n,k}, \hat{z}_{ch,2,conv}^{n,k}]$ with $1 \leq n \leq L_{FFT}$ and $1 \leq k \leq K_{max}$.

For each QMF domain input signal frame with L=32 timeslots a convolution result signal frame with L=32 timeslots is returned. The remaining $L_{FFT}$–32 timeslots are stored and an overlap-add processing is carried out in the following frame(s).

(c) Generation of Late Reverberation

As a second intermediate signal 826a, 826b a reverberation signal called $\hat{z}_{ch,rev}^{n,k}=[\hat{z}_{ch,1,rev}^{n,k},\hat{z}_{ch,2,rev}^{n,k}]$ is generated by a frequency domain reverberator module 816a, 816b. The frequency domain reverberator 816a, 816b takes as input a QMF domain stereo downmix 822 of one frame of the input signal, a parameter set that contains frequency-dependent reverberation times 808 and energy values 810.

The frequency domain reverberator 816a, 816b returns a 2-channel QMF domain late reverberation tail.

The maximum used band number of the frequency-dependent parameter set is calculated depending on the maximum frequency.

First, a QMF domain stereo downmix 818 of one frame of the input signal $\hat{y}_{ch}^{n,k}$ is carried out to form the input of the reverberator by a weighted summation of the input signal channels. The weighting gains are contained in the downmix matrix $M_{DMX}$. They are real-valued and non-negative and the downmix matrix is of dimension $N_{out} \times N_{in}$. It contains a non-zero value where a channel of the input signal is mapped to one of the two output channels.

The channels that represent loudspeaker positions on the left hemisphere are mapped to the left output channel and the channels that represent loudspeakers located on the right hemisphere are mapped to the right output channel. The signals of these channels are weighted by a coefficient of 1. The channels that represent loudspeakers in the median plane are mapped to both output channels of the binaural signal. The input signals of these channels are weighted by a coefficient $$a = 0.7071 \approx \frac{1}{\sqrt{2}}.$$

In addition, an energy equalization step is performed in the downmix. It adapts the bandwise energy of one downmix channel to be equal to the sum of the bandwise energy of the input signal channels that are contained in this downmix channel. This energy equalization is conducted by a bandwise multiplication with a real-valued coefficient $$c_{eq,k} = \sqrt{P_{in}^k / P_{out}^k + \varepsilon}.$$

The factor $c_{eq,k}$ is limited to an interval of [0.5, 2]. The numerical constant $\varepsilon$ is introduced to avoid a division by zero. The downmix is also bandlimited to the frequency $f_{max}$; the values in all higher frequency bands are set to zero.

Figure 13:
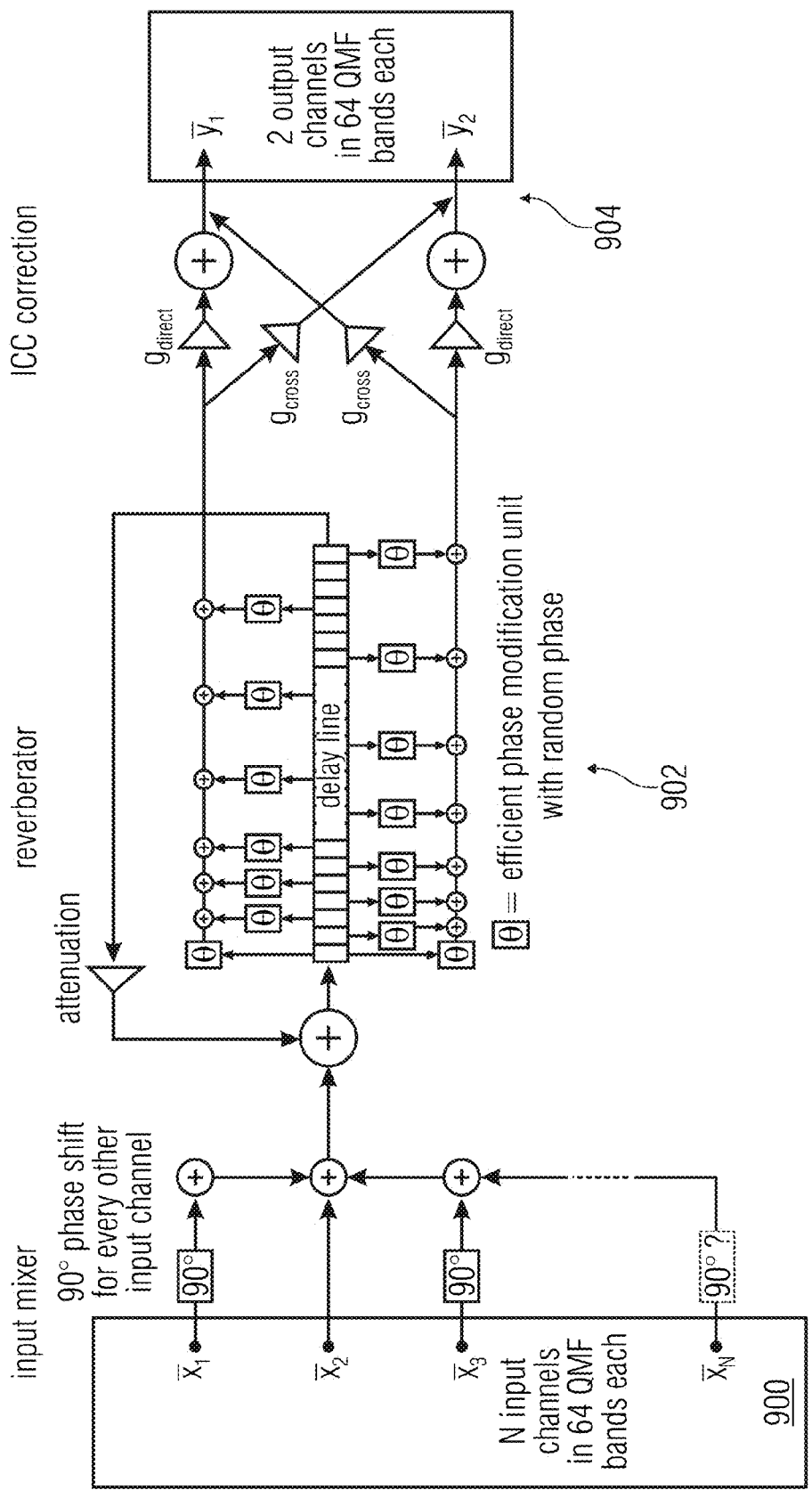
FIG. 13 schematically illustrates the processing in the frequency domain reverberator of the binaural renderer of FIG. 12 in accordance with an embodiment of the present invention.

FIG. 13 schematically represents the processing in the frequency domain reverberator 816a, 816b of the binaural renderer 800 in accordance with an embodiment of the present invention.

In the frequency domain reverberator a mono downmix of the stereo input is calculated using an input mixer 900. This is done incoherently applying a 90° phase shift on the second input channel.

This mono signal is then fed to a feedback delay loop 902 in each frequency band k, which creates a decaying sequence of impulses. It is followed by parallel FIR decorrelators that distribute the signal energy in a decaying manner into the intervals between the impulses and create incoherence between the output channels. A decaying filter tap density is applied to create the energy decay. The filter tap phase operations are restricted to four options to implement a sparse and multiplier-free decorrelator.

After the calculation of the reverberation an inter-channel coherence (ICC) correction 904 is included in the reverberator module for every QMF frequency band. In the ICC correction step frequency-dependent direct gains a $g_{direct}$ and crossmix gains $g_{cross}$ are used to adapt the ICC.

The amount of energy and the reverberation times for the different frequency bands are contained in the input parameter set. The values are given at a number of frequency points which are internally mapped to the K=64 QMF frequency bands.

Two instances of the frequency domain reverberator are used to calculate the final intermediate signal $\hat{z}_{ch,rev}^{n,k}=[\hat{z}_{ch,1,rev}^{n,k},\hat{z}_{ch,2,rev}^{n,k}]$. The signal $\hat{z}ch,1,rev^{n,k}$ is the first output channel of the first instance of the reverberator, and $\hat{z}_{ch,2,rev}^{n,k}$ is the second output channel of the second instance of the reverberator. They are combined to the final reverberation signal frame that has the dimension of 2 channels, 64 bands and 32 time slots.

The stereo downmix 822 is both times scaled 821a,b according to a correlation measure 820 of the input signal frame to ensure the right scaling of the reverberator output. The scaling factor is defined as a value in the interval of [$\sqrt{N_{DMX,act}}, N_{DMX,act}$] nearly depending on a correlation coefficient $c_{corr}$ between 0 and 1 with $$c_{corr} = \frac{1}{N_{in}^2} \cdot \sum_{A=1}^{A=N_{DMX,act}} \sum_{B=1}^{B=N_{DMX,act}} c_{corr}^{A,B} \text{ and}$$

$$C_{corr}^{A,B} = \left| \frac{1}{K-1} \cdot \frac{\sum_k \sum_n \hat{y}_{ch,A}^{n,k} \cdot \hat{y}_{ch,B}^{n,k*}}{\sum_n \sigma_{\hat{y}_{ch,A}^n} \cdot \sigma_{\hat{y}_{ch,B}^n}} \right|$$

where $\sigma_{\hat{y}_{ch,A}^n}$ means the standard deviation across one time slot n of channel A, the operator $\{*\}$ denotes the complex conjugate and $\hat{y}$ is the zero-mean version of the QMF domain signal $\hat{y}$ in the actual signal frame.

$c_{corr}$ is calculated twice: once for all channels A,B that are active at the actual signal frame F and are included in the left channel of the stereo downmix and once for all channels A,B that are active at the actual signal frame F and that are included in the right channel of the stereo downmix.

$N_{DMX,act}$ is the number of input channels that are downmixed to one downmix channel A (number of matrix element in the Ath row of the downmix matrix $M_{DMX}$ that are unequal to zero) and that are active in the current frame.

The scaling factors then are $$c_{scale} = [c_{scale,1}, c_{scale,2}]$$

$$= [\sqrt{N_{DMX,act,1}} + c_{corr} \cdot (N_{DMX,act,1} - \sqrt{N_{DMX,act,1}}), \sqrt{N_{DMX,act,2}} + c_{corr} \cdot (N_{DMX,act,2} - \sqrt{N_{DMX,act,2}})].$$

The scaling factors are smoothed over audio signal frames by a $1^{st}$ order low pass filter resulting in smoothed scaling factors $\tilde{c}_{scale}=[\tilde{c}_{scale,1},\tilde{c}_{scale,2}]$.

The scaling factors are initialized in the first audio input data frame by a time-domain correlation analysis with the same means.

The input of the first reverberator instance is scaled with the scaling factor $\tilde{c}_{scale,1}$ and the input of the second reverberator instance is scaled with the scaling factor $\tilde{c}_{scale,2}$.

(d) Combination of Convolutional Results and Late Reverberation

Next, the convolutional result 814, $\hat{z}_{ch,conv}^{n,k} = [\hat{z}_{ch,1,conv}^{n,k}, \hat{z}_{ch,2,conv}^{n,k}]$, and the reverberator output 826a, 826b, $\hat{z}_{ch,rev}^{n,k} = [\hat{z}_{ch,1,rev}^{n,k}, \hat{z}_{ch,2,rev}^{n,k}]$, for one QMF domain audio input frame are combined by a mixing process 828 that bandwise adds up the two signals. Note that the upper bands higher than $K_{max}$ are zero in $\hat{z}_{ch,conv}^{n,k}$ because the convolution is only conducted in the bands up to $K_{max}$.

The late reverberation output is delayed by an amount of $d = ((L_{trans} - 20 \cdot 64 + 1)/64 + 0.5) + 1$ time slots in the mixing process.

The delay d takes into account the transition time from early reflections to late reflections in the BRIRs and an initial delay of the reverberator of 20 QMF time slots, as well as an analysis delay of 0.5 QMF time slots for the QMF analysis of the BRIRs to ensure the insertion of the late reverberation at a reasonable time slot. The combined signal $\hat{z}_{ch}^{n,k}$ at one time slot n calculated by $\hat{z}_{ch,conv}^{n,k} + \hat{z}_{ch,rev}^{n-d,k}$.

(e) QMF Synthesis of Binaural QMF Domain Signal

One 2-channel frame of 32 time slots of the QMF domain output signal $\hat{z}_{ch}^{n,k}$ is transformed to a 2-channel time domain signal frame with length L by the QMF synthesis according to ISO/IEC 14496-3:2009, subclause 4.6.18.4.2. yielding the final time domain output signal 830, $\tilde{z}_{ch}^{v} = [\tilde{z}_{ch,1}^{v} \ldots \tilde{z}_{ch,2}^{v}]$.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or programmed to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LITERATURE

[1] T. Hidaka et al: "A new definition of boundary point between early reflections and late reverberation in room impulse responses". Forum Acusticum, 2005.
[2] Jot et al: "Analysis and synthesis of room reverberation based on a statistical time frequency model".
[3] J. S. Abel, P. Huang: "A Simple, Robust Measure of Reverberation Echo Density". AES Convention, San Francisco, 2006.
[4] R. Stewart, M. Sandler: "Statistical Measures of Early Reflections of Room Impulse Responses". DAFx, 2007.

[5] Reilly et al: "Using Auralisation for Creating Animated 3-D Sound Fields Across Multiple Speakers". AES Convention, New York, 1995.
[6] Usher, J.: "An improved method to determine the onset timings of reflections in an acoustic impulse response". Journal of the Acoustical Society of America, (2010, volume 127) band 4, p. 172-177.
[7] Masri, P.: "Computer Modelling of Sound for Transformation and Synthesis of Musical Signals". PhD thesis, University of Bristol, 1996.

The invention claimed is:

1. A method for processing an audio signal in accordance with a room impulse response, the method comprising:
   separately processing, by a processing unit, the audio signal with an early part and a late reverberation of the room impulse response; and
   combining, by a processing unit, the audio signal processed with the early part of the room impulse response and a reverberated signal,
   wherein a transition from the early part to the late reverberation in the room impulse response is determined once a correlation measure reaches a threshold,
   wherein the correlation measure describes with regard to the room impulse response a similarity of a decay in acoustic energy comprising an initial state and of the decay in acoustic energy starting at a time following the initial state over a predefined frequency range,
   wherein the threshold is set dependent on the correlation measure for a selected one of the early reflections in the early part of the room impulse response,
   wherein the selected one of the early reflections is the first reflection, and
   wherein the processing unit comprises a hardware implementation.

2. The method of claim 1, wherein determining the transition comprises:
   determining a distribution of acoustic energy based on the room impulse response; and;
   determining a plurality of correlation measures indicating for a plurality of portions of the determined distribution a correlation between the acoustic energy in the respective portion of the determined distribution and the acoustic energy at an initial state.

3. The method of claim 2, wherein
   determining the distribution comprises determining a time-frequency distribution of the acoustic energy, and
   a portion of the distribution comprises a time block of a predefined length, the initial state being defined by the first one of a plurality of time blocks of the time-frequency distribution.

4. The method of claim 3, wherein the room impulse response comprises a predefined effective length, and wherein determining the time-frequency distribution comprises calculating the FFT spectrum of the room impulse response using a window comprising a length corresponding to the effective length of the room impulse response.

5. The method of claim 2, wherein determining the distribution comprises calculating the energy decay relief (EDR) from the room impulse response.

6. The method of claim 5, wherein the EDR is calculated as follows:

$$E(t,\omega)=|\int_t^\infty h(\tau)e^{-j\omega\tau}d\tau|^2$$

where
$E(t,\omega)$=energy decay relief at frequency f starting a time t,
$h(\tau)$=room impulse response,
$\omega=2\pi f$.

7. The method of claim 1, wherein the correlation measure is calculated as follows:

$$\rho(t) = \frac{\sum_\omega (E(1,\omega) - \overline{E}(1,\omega)) \cdot \sum_\omega (E(t,\omega) - \overline{E}(t,\omega))}{\sqrt{\sum_\omega (E(1,\omega) - \overline{E}(1,\omega))^2} \cdot \sqrt{\sum_\omega (E(t,\omega) - \overline{E}(t,\omega))^2}}$$

where
$\rho(t)$=correlation measure,
$E(1,\omega)$=full frequency range energy decay relief at frequency f,
$\overline{E}(1,\omega)$=mean value over all frequencies of an initial full range energy decay relief,
$E(t,\omega)$=energy decay relief at frequency f starting a time t,
$\overline{E}(t,\omega)$=mean value over all frequencies of the full range energy decay relief starting at time t,
$\omega=2\pi f$.

8. The method of claim 1, wherein the threshold is determined based on a constant value and the correlation measure for the selected one of the early reflections.

9. The method of claim 8, wherein the constant is 1/e, and wherein the threshold is defined as follows:

$$\rho(t)=c \cdot \rho(t_F)$$

where
$\rho(t_F)$=correlation measure for the selected one of the early reflections,
$t_F$=time index where the selected one of the early reflections after the direct sound impinges,
c=the constant value that is based on $$\frac{1}{e},$$

e being the Euler number.

10. A non-transitory digital storage medium having computer-readable code stored thereon to perform the method of claim 1 when said storage medium is run by a computer.

11. A signal processing unit, comprising
   an input for receiving an audio signal;
   a processor configured to process the received audio signal in accordance with a room impulse response according to the method of claim 1; and
   an output for combining the processed early part of the received audio signal and the reverberated signal into an output audio signal,
   wherein the processor comprises a hardware implementation.

12. The signal processing unit of claim 11, comprising:
   an early part processor for processing the received audio signal in accordance with the early part of the room impulse response; and
   a late reverberation processor for processing the received audio signal in accordance with the late reverberation of the room impulse response.

13. A binaural renderer, comprising the signal processing unit of claim 11.

14. An audio encoder for encoding an audio signal, wherein the audio encoder is configured to process an audio signal to be encoded in accordance with a room impulse response in accordance with the method of claim 1.

15. The audio encoder of claim 14, wherein the audio encoder comprises a signal processing unit, comprising
an input for receiving an audio signal;
a processor configured to process the received audio signal in accordance with a room impulse response; and
an output for combining the processed early part of the received audio signal and the reverberated signal into an output audio signal,
wherein the processor comprises a hardware implementation.

16. An audio decoder for decoding an encoded audio signal, wherein
the audio decoder is configured to process a decoded audio signal in accordance with a room impulse response in accordance with the method of claim 1.

17. The audio decoder of claim 16, wherein the audio decoder comprises a signal processing unit, comprising
an input for receiving an audio signal;
a processor configured to process the received audio signal in accordance with a room impulse response; and
an output for combining the processed early part of the received audio signal and the reverberated signal into an output audio signal,
wherein the processor comprises a hardware implementation.

18. The audio decoder of claim 16, comprising a renderer configured to receive the decoded audio signal and to render output signals based on the room impulse response.

19. The audio decoder of claim 18, wherein the renderer comprises a binaural renderer.

* * * * *